(12) United States Patent
Deacon et al.

(10) Patent No.: US 11,787,631 B2
(45) Date of Patent: Oct. 17, 2023

(54) CONTROL DEVICE AND METHOD FOR A ROBOT SYSTEM

(71) Applicant: Ocado Innovation Limited, Hatfield (GB)

(72) Inventors: Graham Deacon, Hatfield (GB); Osemwaro Pedro, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 350 days.

(21) Appl. No.: 16/764,724

(22) PCT Filed: Nov. 16, 2018

(86) PCT No.: PCT/EP2018/081589
§ 371 (c)(1),
(2) Date: May 15, 2020

(87) PCT Pub. No.: WO2019/097004
PCT Pub. Date: May 23, 2019

(65) Prior Publication Data
US 2021/0171283 A1 Jun. 10, 2021

(30) Foreign Application Priority Data

Nov. 17, 2017 (GB) ..................................... 1719058

(51) Int. Cl.
*G06F 7/00* (2006.01)
*B65G 1/04* (2006.01)
(Continued)

(52) U.S. Cl.
CPC .......... *B65G 1/0464* (2013.01); *B25J 9/1602* (2013.01); *B25J 9/1612* (2013.01); *B25J 9/1697* (2013.01);
(Continued)

(58) Field of Classification Search
CPC .... B65G 1/0464; B65G 1/0492; B25J 9/1602; B25J 9/1612; B25J 9/1697;
(Continued)

(56) References Cited

U.S. PATENT DOCUMENTS 7,940,263 B2  5/2011  Miura et al.
9,346,166 B2  5/2016  Gotou
(Continued)

FOREIGN PATENT DOCUMENTS

CN        1895025 A    1/2007
CN      102982557 A    3/2013
(Continued)

OTHER PUBLICATIONS

Office Action (Examination Report No. 1) dated Feb. 18, 2021, by the Australian Patent Office in corresponding Australian Patent Application No. 2018368575. (5 pages).
(Continued)

*Primary Examiner* — Yolanda R Cumbess
(74) *Attorney, Agent, or Firm* — BUCHANAN INGERSOLL & ROONEY PC

(57) ABSTRACT

A control device is provided to reliably locate objects and calculate appropriate grasp points for each object to thereby effectively control a robot system. grasp point calculation is based on, at least, properties of a surface of the object to be grasped by the robot system to more effectively calculate a grasp point for the surface of the object. An organised point cloud generator and a robot system having a suction cup end are arranged to generate an organised point cloud of a storage. The robot system can grasp the object from the storage means. Normals of the organised point cloud and principal curvatures of the organised point cloud can be calculated. A grasp point can be calculated for the suction cup end effector of the robot system to grasp an object based
(Continued)

on the organised point cloud, the calculated normal, the calculated principal curvatures, and a normal of a lower surface of the storage.

37 Claims, 20 Drawing Sheets

(51) Int. Cl.
  *G06T 7/187*  (2017.01)
  *G06T 7/136*  (2017.01)
  *G06T 7/11*  (2017.01)
  *B25J 9/16*  (2006.01)
  *G06T 7/60*  (2017.01)
  *B25J 15/06*  (2006.01)

(52) U.S. Cl.
  CPC .............. *B65G 1/0492* (2013.01); *G06T 7/11* (2017.01); *G06T 7/136* (2017.01); *G06T 7/187* (2017.01); *G06T 7/60* (2013.01); *B25J 15/0616* (2013.01); *G05B 2219/39484* (2013.01); *G05B 2219/40053* (2013.01); *G05B 2219/40563* (2013.01); *G06T 2207/10028* (2013.01); *G06T 2207/20156* (2013.01)

(58) Field of Classification Search
  CPC ....... B25J 15/0616; B25J 9/1669; G06T 7/11; G06T 7/136; G06T 7/187; G06T 7/60; G06T 2207/10028; G06T 2207/20156; G06T 7/70; G05B 2219/39484; G05B 2219/40053; G05B 2219/40563; B62L 3/00; B60T 2220/02; B60T 2270/604; B60T 8/1706; Y02T 90/16; B60L 7/24; B60L 7/10; B60L 2250/18; B62J 27/00
  USPC ................................ 700/213–214, 228, 245
  See application file for complete search history.

(56) References Cited

U.S. PATENT DOCUMENTS

| | | | |
|---|---|---|---|
| 2009/0051680 A1 | 2/2009 | Miura et al. | |
| 2012/0308140 A1 | 12/2012 | Ambrus et al. | |
| 2014/0067127 A1 | 3/2014 | Gotou | |
| 2014/0320629 A1* | 10/2014 | Chizeck | G06T 15/04 |
| | | | 348/81 |
| 2015/0081090 A1 | 3/2015 | Dong | |
| 2017/0178341 A1 | 6/2017 | El-Sheimy et al. | |
| 2017/0215772 A1 | 8/2017 | Garn et al. | |
| 2020/0184278 A1* | 6/2020 | Zadeh | G06N 3/044 |
| 2022/0121884 A1* | 4/2022 | Zadeh | G06V 10/764 |

FOREIGN PATENT DOCUMENTS

| | | |
|---|---|---|
| CN | 105598965 A | 5/2016 |
| CN | 107138432 A | 9/2017 |
| DE | 102014218140 B3 | 3/2016 |
| JP | 2006268188 A | 10/2006 |
| JP | 2011167815 A | 9/2011 |
| JP | 2014039983 A | 3/2014 |
| JP | 2014046371 A | 3/2014 |
| JP | 2014205209 A | 10/2014 |
| JP | 2014240110 A | 12/2014 |
| JP | 2016529181 A | 9/2016 |
| JP | 2017202549 A | 11/2017 |
| KR | 10-2014-0065058 A | 5/2014 |
| NO | 317366 B1 | 10/2004 |
| WO | 9849075 A1 | 11/1998 |
| WO | 2015019055 A1 | 2/2015 |
| WO | 2015185628 A2 | 12/2015 |
| WO | 2017152224 A1 | 9/2017 |

OTHER PUBLICATIONS

International Search Report (with English Translation) and Written Opinion issued in corresponding International Patent Application No. PCT/EP2018/081589, 14 pages (dated Feb. 11, 2019).
Asif, U., et al., "Model-Free Segmentation and Grasp Selection of Unknown Stacked Objects," http://dx.doi.org/10.1007/978-3-319-10602-1_43; Springer International Publishing Switzerland 2014, D. Fleet et al. (Eds.): ECCV 2014, Part V, LNCS 8693, pp. 659-674 (2014).
Rabbani, T., et al., "Segmentation of point clouds using smoothness constraints," Proceedings of the ISPRS Commission v Symposium vol. 35, Part 6: Image Engineering and Vision Metrology, Dresden, Germany on Sep. 25-27, 2006, pp. 248-253 (Sep. 25, 2006).
Richtsfeld, A., et al., "Segmentation of unknown objects in indoor environments," Conference Paper in Proceedings of the . . . IEEE/RSJ International Conference on Intelligent Robots and Systems. IEEE/RSJ International Conference on Intelligent Robots and Systems; DOI: 10.1109/IROS.2012.6385661, 7 pgs. (Oct. 2012).
Swagat, K., et al., "Design and Development of an automated Robotic Pick & Stow System for an e-Commerce Warehouse," arxiv.org, Cornell University Library, 201 Olin Library Cornell University Ithaca, NY, pp. 1-15 (Mar. 7, 2017).
Ten Pas, A., et al., "Grasp Pose Detection in Point Clouds," The Author(s) 2015, Sagepub.co.uk/journalsPermissions.nav DOI: 10.1177, www.sagepub.com, pp. 1-17 (Jun. 9, 2015).
Zeng, A., et al., "Robotic Pick-and-Place of Novel Objects in Clutter with Multi-Affordance Grasping and Cross-Domain Image Matching," Princeton University; URL:http://3division.princeton.edu/projects/2017/arc/paper.pdf, 9 pages (Oct. 3, 2017).
Office Action (Notice of Final Rejection) dated Nov. 22, 2021, by the Korean Patent Office in corresponding Korean Patent Application No. 10-2020-7014929, and an English Translation of the Office Action. (8 pages).
Office Action dated May 27, 2021, by the Canadian Patent Office in corresponding Canadian Patent Application No. 3,078,850. (5 pages).
First Office Action dated Jul. 6, 2021, by the Japanese Patent Office in corresponding Japanese Patent Application No. 2020-526617, and an English Translation of the Office Action. (4 pages).
Office Action (Notification of Reason for Refusal) dated Jun. 17, 2021, by the Korean Patent Office in corresponding Korean Patent Application No. 10-2020-7014929, and an English Translation of the Office Action. (12 pages).
Office Action (Communication) dated Oct. 20, 2021, by the European Patent Office in corresponding European Patent Application No. 18807252.4 (10 pages).
Office Action dated Sep. 13, 2022, by the Chinese Patent Office in corresponding Chinese Patent Application No. 201880074013, and a machine English Translation of the Office Action. (29 pages).
First Office Action dated Apr. 4, 2023, by the Japanese Patent Office in corresponding Japanese Patent Application No. 2022-025729, and an English Translation of the Office Action. (6 pages).
Office Action (Examination Report No. 1) dated Mar. 31, 2023, by the Australian Patent Office in corresponding Australian Patent Application No. 2021266348. (3 pages).
Office Action (Examination Report No. 2) dated Jun. 21, 2023, by the Australian Patent Office in corresponding Australian Patent Application No. 2021266348. (2 pages).
First Office Action dated Jul. 4, 2023, by the Japanese Patent Office in corresponding Japanese Patent Application No. 2022-025729, and an English Translation of the Office Action. (5 pages).

* cited by examiner

CONTROL DEVICE AND METHOD FOR A ROBOT SYSTEM

This application claims priority from UK Patent Application No. 1719058.8 filed 17 Nov. 2017, the content of all this application hereby being incorporated by reference.

TECHNICAL FIELD

The present invention relates generally to the field of robot systems and more specifically to a control device and method for controlling a robot system together with a grocery shopping packing system and a storage system.

BACKGROUND

In the field of computer vision and robotics the concept of locating imaged objects and instructing a robot system to grasp the imaged object is a developing field. Typically this has been achieved using a model-based approach in which a database stores a model of the object to be grasped and indicates locations on the object which may be successfully grasped by the robot system. Therefore, the database model may be compared with the imaged scene to locate known, modelled objects in the scene. The robot system may then be tasked with grasping the located object using the grasp points identified by the model.

However, this approach relies on an accurate model of the object to be stored in a database which may not be practical when there is a large number of object types, or when there are wide variations in the appearance of a specific object type, making it difficult to model.

Accordingly, interest has turned to the concept of model-free picking in which no model is stored in a database and, instead, a controller determines from an imaged scene both the locations of the visible objects in the scene and an appropriate grasp points for at least one of the objects.

The present inventors, facing the problem of grasping objects which are tightly packed in a container or the like, selected the use of a suction cup end effector for a robot system. Moreover, the selection of a suction cup end effector is easily implemented mechanically whilst being robust and reliable. Their attention then turned to selecting suitable grasp points for an object in a region with a high density of other objects.

In "Model-Free Segmentation and Grasp Selection of Unknown Stacked Objects" by Umar Asif et al, a model-free approach for object grasping is disclosed utilising parallel jaw grippers. Accordingly, a grasp calculation algorithm is disclosed which generates pairs of grasping points using reflection symmetry. However, it assumes that the objects are situated in free space which generally requires, for an object in a container, a vision system to perform path planning to find a collision-free route to the object for the end effector.

Similarly, "Grasp Pose Detection in Point Clouds" by Andreas ten Pas et al disclose a model-free approach also using parallel jaw grippers on a robot system. However, their approach does not segment objects hence multiple objects may be detected as a single object.

Both of the above described papers disclose the use of parallel jaw grippers which do not permit operation in tightly packet environments due to interference with other objects in the environment. Therefore, the grasp points calculated do not provide effective positions for a suction cup end effector to grasp the object.

Therefore, there is a need for a more appropriate grasp point determining and controlling apparatus and method to determine appropriate grasp points for an object without using the traditional model based approach and suitable for a suction cup end effector.

SUMMARY

In view of the problems in known model-free approaches, the present invention aims to provide an apparatus and method to reliably locate objects and calculate appropriate grasp points for each object to thereby effectively control a robot system.

In general terms, the invention introduces grasp point calculation based on, at least, properties of a surface of the object to be grasped by the robot system to more effectively calculate a grasp point for the surface of the object.

The present invention provides a control device for a robot system, the control device connectable to an organized point cloud generator and a robot system comprising a suction cup end effector, the organized point cloud generator arranged to generate an organized point cloud of at least one storage means arranged to contain at least one object, the robot system arranged to grasp at least one object from the at least one storage means. The control device comprises a surface calculating means arranged to calculate normals of the organized point cloud and principal curvatures of the organized point cloud. The control device also comprises a grasp point calculating means arranged to calculate a grasp point for the suction cup end effector of the robot system to grasp at least one object from the at least one storage means based on the organized point cloud, the calculated normals of the organized point cloud, the calculated principal curvatures of the organized point cloud and a normal of a lower surface of the storage means.

The present invention also provides a system. The system comprises an organized point cloud generator arranged to generate an organized point cloud of at least one storage means comprising at least one object. The system also comprises a robot system comprising a suction cup end effector arranged to grasp at least one object from the at least one storage means. The system also comprises a control device as previously described arranged to control the robot system based on the calculated grasp points.

The present invention also provides a grocery shopping packing system. The grocery shopping packing system comprises a first storage means arranged to contain many objects of the same product, a second storage means arranged to contain many objects of different products and a system as previously described. The robot system is arranged to move at least one object from the first storage means into the second storage means.

The present invention also provides a storage system. The storage system comprises a first set of parallel rails or tracks extending in an X-direction, and a second set of parallel rails or tracks extending in a Y-direction transverse to the first set in a substantially horizontal plane to form a grid pattern comprising a plurality of grid spaces. A plurality of stacks of containers are located beneath the rails, and arranged such that each stack is located within a footprint of a single grid space. At least one transporting device, the at least one transporting device being arranged to selectively move in the X and/or Y directions, above the stacks on the rails and arranged to transport a container. The storage system further comprises a picking station arranged to receive a container transported by the at least one transporting device and a system as previously described, wherein the system is arranged to grasp an object from a container.

The present invention also provides a method of controlling a robot system, the robot system comprising a suction cup end effector and arranged to grasp at least one object from at least one storage means arranged to contain the least one object. The method comprises the step of receiving an organized point cloud of the at least one storage means. The method also comprises the step of calculating normals of the organized point cloud and principal curvatures of the organized point cloud. The method comprises the step of calculating a grasp point for the suction cup end effector of the robot system to grasp at least one object from the at least one storage means based on the organized point cloud, the calculated normals of the organized point cloud, the calculated principal curvatures of the organized point cloud and a normal of a lower surface of the storage means.

BRIEF DESCRIPTION OF THE DRAWINGS

Embodiments of the invention will now be described by way of example only with reference to the accompanying drawings, in which like reference numbers designate the same or corresponding parts, and in which.

DETAILED DESCRIPTION OF EMBODIMENTS

First Embodiment

Figure 1:
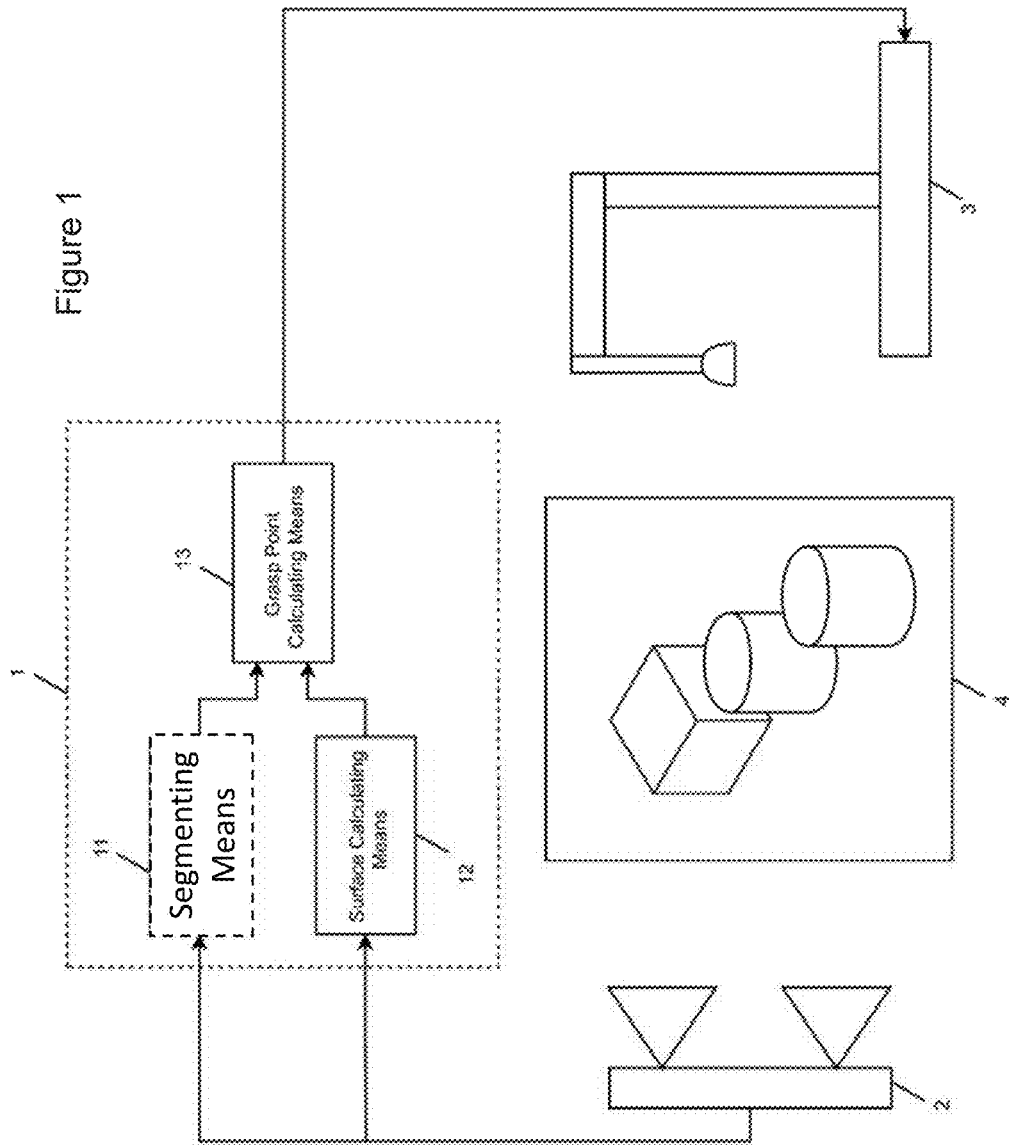
FIG. 1 is a schematic diagram of a grasping set up including an organized point cloud generator, container with a number of objects, a robot system and a controller according to a first embodiment of the present invention.

FIG. 1 depicts a system for grasping objects from a container 4 together with a controller 1 according to the first embodiment of the present invention. In this system, from a top level, a container 4 is provided which is arranged to store at least one object. An organized point cloud generator 2 is provided in a position to generate an organized point cloud of the container and the objects, if any, contained in the container 4. The organized point cloud is input into a controller 1 according the first embodiment which is arranged to calculate a grasp point for an object in the container 4. A robot system is provided connected to the controller 1 to receive the grasp point from the controller 1 and then to grasp the object at the identified grasp point.

In more detail, the container 4 as depicted contains three objects which are desired to be moved from the container 4 by the robot system 3. As will be appreciated, the container 4 can contain any number of objects or no objects at all. The container typically includes a lower surface, a floor, to support the objects and walls, for example, 4 walls to prevent objects falling out. However, as will be appreciated, the container could be any size or configuration to hold objects, for example, comprising three walls, five walls etc.

Ideally the objects contained in the container 4 are positioned below the top of the walls, however, the first embodiment is equally applicable to a container in which the objects extend above the top of the walls, for example, due to large objects placed in the container 4 or due to a large number of objects piled in the container 4.

The organized point cloud generator 2 is positioned to view the contents of the container 4. In a typical setup the lower surface of the container 4 is arranged horizontally with the organized point cloud generator 2 arranged above the container 4 with the sensors of the organized point cloud generator 2 facing vertically down to view the contents of the container 4. Examples of appropriate organized point cloud generators 2 are structured light devices such as first generation Microsoft Kinect device, time of flight devices, ultrasound devices, stereo camera pairs and laser stripers. These devices typically generate depth map images which are images including depth information of the scene viewed by the device. In the art, it is usual to calibrate the depth map images for aberrations in the lenses and sensors of the device. Once calibrated, the depth map can be transformed into a set of metric 3D points, known as a point cloud. Preferably, the point cloud is an organized point cloud which means that each three dimensional point lies on a line of sight of a distinct pixel resulting in a one-to-one correspondence between 3D points and pixels. Organisation is desirable because it allows for more efficient point cloud processing. In a further part of the calibration process the organized point cloud generator's pose, namely its position and orientation, relative to a reference frame of the robot system 3, is determined (for example, the reference frame may be the base of the robot system, however, any reference frame known will work, for example, a reference frame situated at a wrist joint of the robot system). Accordingly, an organized point cloud is generated based on a depth map and information about the lenses and sensors used to generate the depth map. Optionally, the generated depth map may be transformed into the reference frame of the robot system 3. Therefore, the organized point cloud generator 2 may comprise a depth map generating means (not shown) to generate an image including depth information of the container 4 and objects together with a depth map calibration means (not shown) arranged to calibrate the generated depth map to generate an organized point cloud based on information about the lenses and sensors of the depth map generating means. For simplicity, the organized point cloud generator 2 is shown as a single unit in FIG. 1. However, as will be appreciated, each of the functions of depth map generating and depth map calibration could be performed by separate units, for example, the depth map calibration means could be integrated in the controller 1 of the first embodiment.

The controller 1 receives the generated organized point cloud to thereby generate a grasp point to be used by the robot system 3. However, in certain circumstances a grasp point is not generated. For example, if the container does not contain any objects then the controller 1 does not generate any grasp point and instead generates an indication that the container 4 is empty.

In some circumstances, the robot system 3 may fail to grasp an object by the generated grasp point, in this situation the controller 1 may be arranged to cause the re-calculation of a grasp point but limiting the data input, for example, choosing to not include all of the point cloud information in the calculation of the grasp point. This advantageously results in the calculation of a different grasp point from the one previously calculated. Moreover, if no grasp point is found then the controller 1 may be arranged to recapture the organized point cloud from the organized point cloud generator 2. In this case it is assumed that grasp point calculation has failed due to sensor noise in the captured organized point cloud. By recapturing the organized point cloud sensor noise can be varied resulting in successful grasp point calculation.

In some situations, the controller 1 may fail to generate a grasp point and/or the robot system 3 may fail to grasp an object by a generated grasp point. In either or both of these situations, the controller 1 may command the robot system 3 to nudge at least one object in the container 4. In this way, the robot system 3 is commanded to change the orientation and/or position of an object in the container 4 using a small movement such as causing the interaction between the suction end effector and the object but not so as to grasp the object. In this way, a newly captured organized point cloud will comprise at least one differently placed/oriented object for which a grasp point may be successfully generated and the object may be successfully grasped by the robot system 3.

The generated grasp point is received by the robot system 3 comprising a suction cup end effector. The use of a suction cup end effector permits the use of a single grasp point for grasping objects, which makes it well-suited to lifting individual items out of a tightly-packed array, where many other kinds of end effector would fail, due to the lack of space around the items for their protruding parts. It may also be effective on objects which are easily deformed. The robot system 3 uses the suction cup end effector, which is of a known area and radius, to grasp an object from the container 4 using the calculated grasp point. The robot system 3 is able to thereby easily move objects inside the container 4 to another location within the container 4 or to a location outside of the container 4.

Accordingly, the controller 1 of the first embodiment advantageously finds a grasp location that suits the operation of a particular robotic end-effector. This solution lends itself to being able to pick objects for which it is not possible to have a representative model, like deformable objects and objects that are never the same shape twice (for example, a potato or a bag of crisps).

Moreover, the solution provided according to the first embodiment allows grasp points to be identified for objects located in the vicinity of many other objects to be grasped, in other words, for densely arranged objects.

The controller 1 comprises a surface calculating means 12 and a grasp point calculating means 12. Optionally, the controller 1 comprises a segmenting means 11. In this way, generally, the surface calculating means 12 calculates certain properties of the surface imaged by the organized point generator 2, which corresponds with the contents of the container 4. The grasp point calculating means 13 then calculates grasp points based on the calculated surface properties and the generated organized point cloud.

Figure 2:
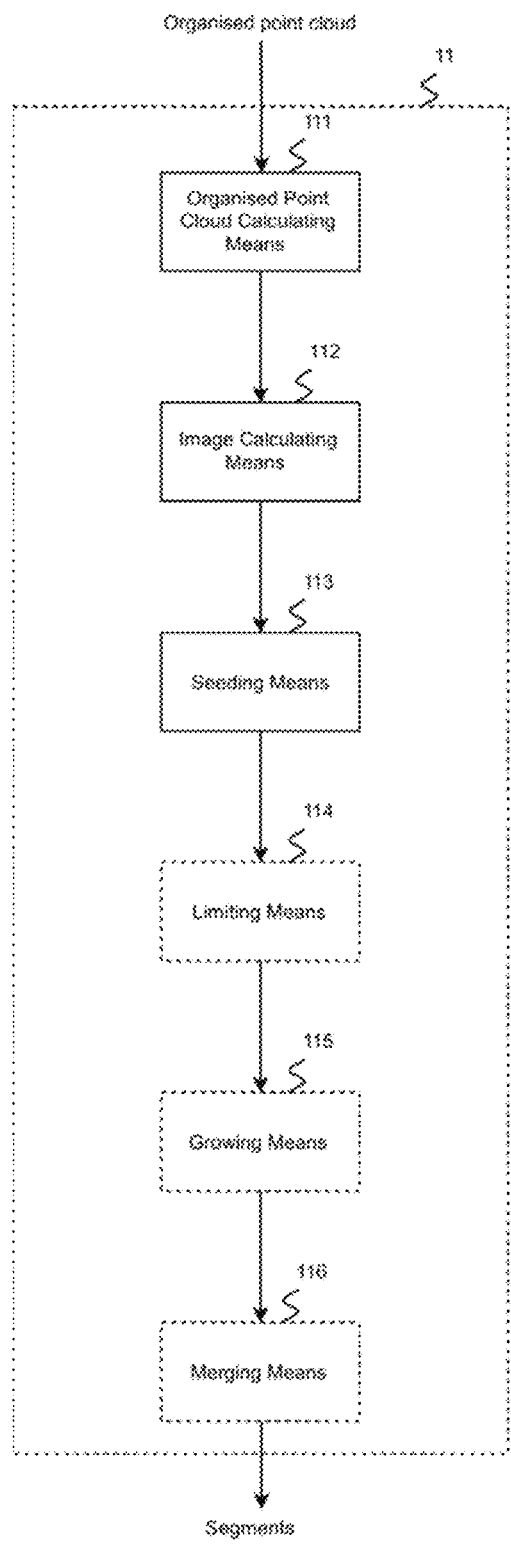
FIG. 2 is a block diagram showing further detail of a segmenting means of the controller according to the first embodiment.

FIG. 2 shows in more detail of the optional the segmenting means 11 utilised by the present inventors in the controller 1 of the first embodiment. The segmenting means 11 may be used to divide the surface generated by the organized point cloud generator 2 into at least one segmented surfaces (also known as segments) which correspond with at least a portion of the generated organized point cloud. Generally, the segmented surfaces correspond to individual objects within the container 4. For example, based on FIG. 1, three segments would be generated corresponding to each object in the container 4 (namely the two cylinders and one cube). However, the segmenting means 11 is optional because a valid grasp point of an object within the container 4 is generated by the grasp point calculating means 13, even without segmented surfaces of the container 4 being generated by the segmenting means 11. Effectively, without the segmenting means 11, the entire generated organized point cloud is treated as a single segmented surface. However, because such a surface has valid properties which may be acting upon by the surface calculating means 12 and the grasp point calculating means 13 to generate a grasp point then the segmenting means 11 is considered optional. As described above, advantageously the segmenting means 11 may be employed to more effectively calculate grasp points which generally correspond to individual objects in the container 4.

The segmenting means 11 receives the organized point cloud and uses it to generate segmented surfaces also known as segments. Ideally, each object in the container 4 as represented in the organized point cloud is identified by a number of surfaces as visible from the organized point cloud generator 2. In one example, the segmenting means 11 is arranged identify objects comprising convex surfaces as a single surface, for example, a cylinder in container 4, as shown in FIG. 1, would be identified as a single surface, the single surface indicating the top flat surface of the cylinder and the round body of the cylinder, which are joined together in a convex manner. Similarly, the cube object in the container 4 shown in FIG. 1 would be identified as a single surface distinct from the cylinder. On the other hand, surfaces which are joined in a concave manner are treated as separate surfaces. For example, between the cube object and the cylinder object lies a concave region. Therefore, the segmenting means 11 may be arranged to generate two segmented surfaces, one corresponding to the cube and one corresponding the cylinder when the concave region defined as the space between the two objects corresponds to a surface boundary between two generated surfaces.

As will be appreciated, although one specific implementation of a segmenting means 11 is depicted in FIG. 2, the present embodiment is envisaged to include other means of segmenting the organized point cloud into segmented surfaces.

For example, "Segmentation of Unknown Objects in Indoor Environments" by Richtsfeld et al, which is incorporated herein by reference, performs segmentation by fitting planes and NURBS surfaces, to estimate surface patches, and then merging the patches together using graphcuts, with pairwise energies defined by an SVM (trained on manually annotated data). As will be appreciated, other means of segmenting the organized point cloud is envisaged within the first embodiment.

One specific means of segmenting the organized point cloud is shown in FIG. 2. This particular implementation has a particular advantage as will be described later. The segmenting means 11 comprises an organized point cloud calculating means 111, image calculating means 112 and seeding means 113. Optionally, a growing means 115 and a merging means 116 are provided. A further optional feature is a limiting means 114 which may be provided.

A smoothed organized point cloud may be used to reduce artefacts in the generated organized point cloud. For simplicity, the following section with described the operation of the optional segmenting means 11 assuming that a smoothed organized point cloud is used, although this is optional and instead an un-smoothed organized point cloud i.e. the generated organized point cloud may instead be used.

The organized point cloud calculating means 111 is arranged to calculate normals of the points of the organized point cloud, a smoothed organized point cloud, first and second derivatives of the organized point cloud, principal curvatures of the organized point cloud and a confidence map. Accordingly, the organized point cloud calculating means 111 calculates differential geometric properties of the organized point cloud.

The image calculating means 112 receives the differential geometric properties, in other words, the normals of the points of the organized point cloud, the smoothed organized point cloud, the first and second derivatives of the organized point cloud, the principal curvatures of the organized point cloud and the confidence map. The image calculating means is arranged to generate a segmentable image based on the first derivative, maximum principal curvatures and the confidence map.

The seeding means 113 receives the segmentable image from the image calculating means 112 and is arranged to generate seed segments. In one particular embodiment the seed segments may be used as the segments upon which to perform grasp point calculation. In other embodiments, further means are provided (as described below) which are optional and further refine the seed segments.

Optionally, the seed segments may be limited by the limiting means 114 which is arranged to impose limits on the boundary of each segment beyond which the segments can't be grown.

A further optional set of features is the growing means 115 and merging means 116. The growing means 115 receives the output of the seeding means 113 and the limiting means 114 (if used). The growing means 115 is arranged to grow the seed segments until no more pixels can be added to the grown segment.

The output grown segments is input into the merging means 116 which is arranged to merge grown segments together, where appropriate.

The merged segments are then output from the segmenting means 11 as the identified segments of the organized point cloud.

In more detail, in one specific implementation of the organized point cloud calculating means, the differential geometric properties are computed in two stages. In a first stage, the smoothed organized point cloud, first and second derivatives of the organized point cloud and confidence map are computed based on the organized point cloud. In a second stage, principal curvatures and normals of the organized point cloud are generated based on a normal of the lower surface of the container, which corresponds with the direction of viewing of the point cloud generator 2, and based on the smoothed organized point cloud and first and second derivatives of the organized point cloud as computed in the first stage. By using principal curvatures, the segmenting means 11 is able to distinguish between points that lie on a ridge or peak and points that lie in a valley or crater. Typically, principal curvatures express the distinctions between ridges/peaks and valleys/craters through signs and magnitudes of a pair of numbers.

In more detail, the smoothed organized point cloud (which may be referred to as the zeroth derivative of the organized point cloud) is computed using one dimensional polynomial fitting. In particular, in one non-limiting implementation, polynomials are fitted to one-dimensional slices of the organized point cloud, subdivided into overlapping windows where each window is of a predetermined radius. More specifically, polynomials are fitted to one-dimensional overlapping windows of a predetermined radius within x-directional slices of the organized point cloud. Similarly, polynomials are also fitted to one-dimensional overlapping windows of a predetermined radius within y-directional slices of the organized point cloud. By refitting polynomials to earlier fitting results and the derivatives of these results, while alternating between refitting in the x direction and refitting in the y direction, smoother estimates of the organized point cloud and its derivatives are generated, and artefacts that would result from only fitting in one direction, that would be detrimental to subsequent processing stages, are removed. Furthermore, the fitting procedures may be weighted as a result of which smoothing across surface discontinuities is avoided. Moreover, the weights may be used to generate a confidence map. A confidence map is a representation of how confidently the polynomial fitting fits to the points of the organized point cloud.

Moreover, the first-order derivatives in both the x-direction and y-direction may be used, together with the normal of the lower surface of the container, to calculate, for each point, the normal and three values known as the first fundamental form. Thereby, the principal curvatures can be calculated based on the normal to each point, the first fundamental form and the second-derivatives.

With regard to the image calculating means 112, this is arranged to calculate the segmentable image based on individual pixels of the output of the organized point cloud calculating means 111. In particular, as the pixelwise product of: an equalized negation of a maximum principal curvatures image, an equalized negation of an organized point cloud gradient norms image and a pixelwise power of a confidence map. In one non-limiting embodiment, the equalized negation of a maximum principal curvatures image comprises minimal values in organized point cloud valleys and maximal values at peaks. Similarly, the equalized negation of an organized point cloud gradient norms image comprises minimal values on steep surfaces and maximal values on horizontal surfaces.

The seeding means 113 is arranged to calculate the seed segments. In one non-limiting example, the seed segments are calculated using a predetermined threshold. Additionally or alternatively, the seeding means 113 may calculate the seed segments by locating the brightest blobs in the segmentable image, and using them as seed segments. The term "blob" in this regard is taken to mean a contiguous set of pixel coordinates, and it will be appreciated that any representation of such a set may be used. In one non-limiting embodiment, the blobs are represented by a binary image, where pixels belonging to a blob have one value, and all other pixels have another value. We shall refer to these values as "white" and "black" respectively, but it is to be understood that the corresponding values may be arbitrary value, provided that they are distinct. In one non-limiting embodiment, a threshold is calculated as a percentile (of a predetermined rank) of pixel values across the at least a portion of an entire segmentable image, and this threshold is used to locate the brightest blobs. For example, under the binary image representation described above, a pixel would be assigned the white value, and hence considered to be part of a blob, if the corresponding segmentable image pixel has a value that it is greater than the threshold. All other pixels would be assigned the black value. In other words, each pixel is assigned either a first value or a second value. In this way definite regions are identified. Moreover, the at least a portion of the entire segmentable image may be determined to correspond with a region of interest of the entire segmentable image, where the region of interest may be calculated by estimating the container's 4 pose and isolating its contents.

As a next stage holes in the generated seed segments are filled by identifying areas that do not intersect any seed segment, but are entirely enclosed by exactly one seed segment. For example, in the binary image representation, black-value areas completely surrounded by white-value areas are filled in with white. Thereby, white-value pixels are used to remove the island of black-value pixels. In this way errors in the initial seeding are corrected.

Turning now to the optional limiting means 114, a mask is first determined of all areas in the segmentable image and a threshold determined as a percentile of a cumulative distribution function of all pixels in the mask that correspond to pixels in the segmentable image. If a pixel has a value less than the predetermined threshold then the pixel is removed from the mask. In this way boundary limits are imposed on each segment beyond which the segment cannot be grown. In one example, the mask corresponds with the region of interest described with regards to the seeding means 113 calculated by estimating the container's 4 pose and isolating its contents.

In this regard, the mask, the same as the seed segments, may be represented as a binary image. In this regard, all binary images mentioned herewith throughout the Detailed Description are envisaged to be represented by and two arbitrary values where each of the two arbitrary values are different. In other words, each pixel in the binary image are assigned either a first value or a second value.

The optional growing means 115 is given the segmentable image, seed segments and cumulative distribution function of the segmentable image. The growing means 115 is arranged to iteratively expand the boundaries of the seed segments based on assessments of whether or not pixels that are adjacent to one or more segments, and that have not yet been added to any segment, are suitable candidates for inclusion within a given segment. A candidate pixel's suitability for inclusion is determined based on a consideration of the similarities between its segmentable image value and the distributions of segmentable image values within the segments, and the difference between its segmentable image value and those of adjacent pixels that already belong to segments. When its segmentable image value is at least as large as one or more of these adjacent pixels, it is added to the segment possessing such pixels that is most similar to it in terms of the aforementioned segmentable image value distributions. All other candidate pixels that are adjacent to the segments are sorted in order of decreasing similarity from their most similar adjacent segment, and are subjected, in this order, to the following test. A candidate pixel is added to its most similar adjacent segment if its inclusion would not change the segment's distribution of segmentable image values by more than a predetermined threshold. Once a candidate pixel fails this test, no further candidates are considered in this iteration of the boundary expansion process. The iteration ends by filling in holes in the newly grown segments. The seed segments are grown until no more pixels pass the inclusion suitability assessment.

The optional merging means 116 is arranged to receive the grown segments and is arranged to merge segments together, where appropriate. In particular, in this implementation two conditions are used to determine whether to merge segments. In particular, when the length of an interface between two segments is less than the product of a predetermined scaling factor and the length of the segment with the shortest perimeter, then the first condition is met. Moreover, when the distribution of segmentable image values along an interface between two segments is similar to the distributions of segmentable image values within both of the segments then the second condition is met. When the first and second conditions are met then the segments are merged.

Figure 3:
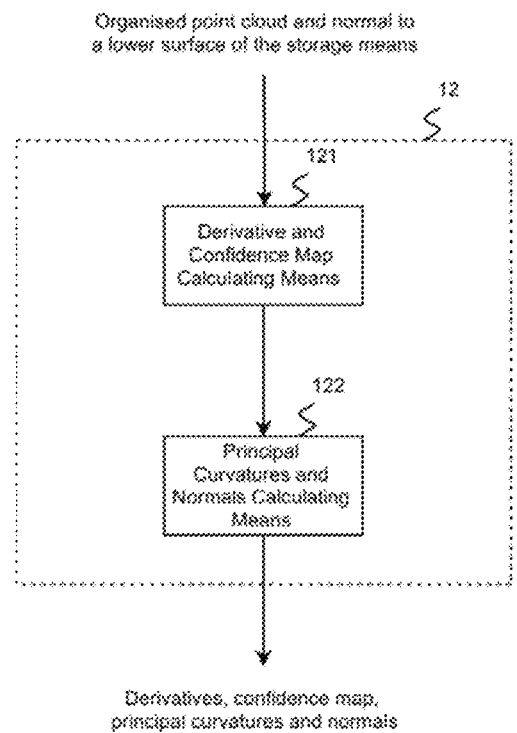
FIG. 3 is a block diagram showing further detail of a surface calculating means of the controller according to the first embodiment.

FIG. 3 depicts in detail the operation of the surface calculating means 12. The surface calculating means 12 receives the organized point cloud generated by the organized point cloud generator 2. In addition, the surface calculating means 12 receives an indication of a normal to the lower surface of the container 4. In this regard, the normal of the lower surface of the container 4 effectively provides an indication of the orientation of the organized point cloud generator 2 relative to the container 4. Accordingly, the normal of the lower surface of the container 4 is a fixed constant when the organized point cloud generator 2 is in a fixed orientation relative to the container 4.

The surface calculating means 12 is arranged to output a first and second derivative of the organized point cloud, a confidence map, and principal curvatures of the organized point cloud and normals of the points of the organized point cloud. Optionally, the surface calculating means 12 is further arranged to output a smoothed organized point cloud, also known as the zeroth derivative of the organized point cloud.

In a preferred embodiment, the output of the smoothed organized point cloud is utilised to remove artefacts from the generated organized point cloud. However, in many situations the generated organized point cloud is smooth enough to permit the accurate and effective calculated of grasp points for the robot system 3 without the need to smooth the organized point cloud.

The surface calculating means 12, in one non-limiting implementation, comprises a derivative and confidence map calculating means 121 and a principal curvatures and normal calculating means 122.

In one particular embodiment the organized point cloud calculating means 111 of the segmenting means 11 and surface calculating means 12 operate in a similar fashion.

In particular, the optional smoothed organized point cloud is computed using one dimensional polynomial fitting. In particular, in one non-limiting implementation, polynomials are fitted to one-dimensional slices of the organized point cloud, subdivided into overlapping windows where each window is of a predetermined radius. More specifically, polynomials are fitted to one dimensional overlapping windows of a predetermined radius within x-directional slices of the organized point cloud. Similarly, polynomials are also fitted to one-dimensional overlapping windows of a predetermined radius within y-directional slices of the organized point cloud. By refitting polynomials to earlier fitting results and the derivatives of these results, while alternating between refitting in the x-direction and refitting in the y-direction, smoother estimates of the organized point cloud and its derivatives are generated which thereby removes artefacts that would result from only fitting in one direction, that would be detrimental to subsequent processing stages, are removed. Furthermore, the fitting procedures may be weighted as a result of which smoothing across surface discontinuities is avoided. Moreover, the weights may be used to generate a confidence map.

The principal curvatures and normal calculating means 122 is arranged to calculate the principal curvatures and normals of the organized point cloud based on the smoothed organized point cloud and first and second derivatives of the organized point cloud.

Moreover, the principal curvatures and normal calculating means 122 may use the first-order derivatives in both the x-direction and y-direction, together with the normal of the lower surface of the container, to calculate, for each point, the normal and three values known as the first fundamental form. Thereby, the principal curvatures can be calculated based on the normal to each point, the first fundamental form and the second-derivatives.

In one non-limiting example, the operation of the organized point cloud calculating means 111 and surface calculating means 12 operate in the same manner and hence when employing the segmenting means 11 described above, the surface calculating means 12 and calculating means 111 may be integrally formed to avoid duplication of operations. In this example, the segmenting means 11 is arranged to output, along with segmented surfaces, the optional smoothed organized point cloud, derivatives of the organized point cloud, and principal curvatures of the organized point cloud and normals of the organized point cloud for input into the grasp point calculating means 13. In this way, the efficiency of the controller 1 is improved because fewer operations are required to effect the determination of an appropriate grasp point.

Figure 4:
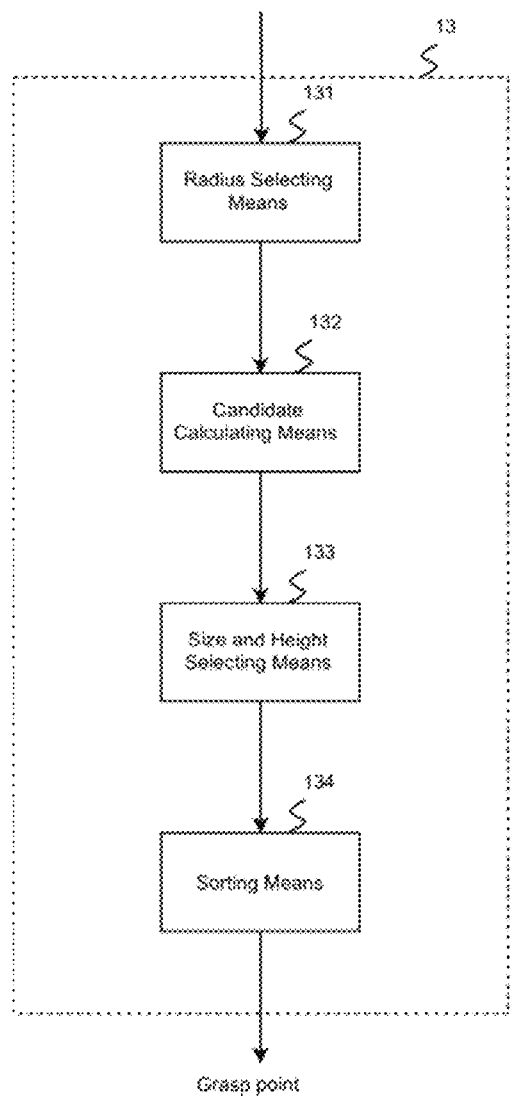
FIG. 4 is a block diagram showing further detail of a grasp point calculating means of the controller according to the first embodiment.

FIG. 4 depicts the operation of the grasp point calculating means 13. The grasp point calculating means 13, in this embodiment, comprises a radius selecting means 131, a candidate calculating means 132, a size and height selecting means 133 and a sorting means 134.

The grasp point calculating means 13 is input with the organized point cloud or the segmented surfaces, depending on whether the segmenting means 11 is employed. The grasp point calculating means is also input with the calculated properties of the surfaces, namely the principal curvature norms of the organized point cloud, normals of the organized point cloud, a normal of a lower surface of the container 4 and the optional smoothed organized point cloud. The grasp point calculating means 13 is arranged to output a grasp point for the robot system 3, but in some circumstance no grasp point is output and, instead, the grasp point calculating means 13 may output an indication that the container 4 is empty or else re-calculate a grasp point.

Principal curvatures distinguish between points that lie on a ridge or peak and points that lie in a valley or crater. Typically, principal curvatures express the distinctions between ridges/peaks and valleys/craters through signs and magnitudes of a pair of numbers. By using principal curvature norms, which correspond with the mean of the absolute values of these number pairs, the distinctions between ridges/peaks and valleys/craters are eliminated.

In the following sections, the description will assume that the segmenting means 11 is used to provide segments of the organized point cloud. However, when the segmenting means 11 is not used then, instead, the organized point cloud is input.

The radius selecting means 131 is arranged to receive the segments from the segmenting means 11 and to remove those segmented surfaces too small to permit the suction cup end effector of the robot system 3 to operate effectively.

The candidate calculating means 132 receives the radius selected segments from the radius selecting means 131 and is arranged to select specific grasp point candidates by operating on specific points of the organized point cloud in those segments selected by the radius selecting means 131 to remove those points which do not pertain to a specific set of conditions. Accordingly, the candidate calculating means 132 selects those points of the radius selected segments which conform to a specific set of conditions. Moreover, in the process of selecting specific grasp point candidates, the candidate calculating means 132 may discard all potential grasp point candidates from a particular segment, accordingly no grasp point candidates remain in the particular segment. In such an instance, the candidate calculating means 132 may be arranged to remove the segment from future operations by discarding the segment. Accordingly, the candidate calculating means 132 is arranged to output grasp point candidates and the segments in which they exist.

The size and height selecting means 133 is arranged to receive the selected grasp point candidates and the segments in which they exist and is arranged to remove those segments based on segment size conditions and height from the lower surface of the container 4. In this way, the size and height selecting means 133 is arranged to select those segments whose size is greater than a particular size or those segments whose distance from the lower surface of the container 4, in other words, the height, is greater than a particular distance (segments satisfying both of these conditions are selected too).

The sorting means 134 is arranged to receive the size and height selected segments with their corresponding grasp point candidates and is arranged to calculate a flatness rating for the grasp point candidates based on the flatness of a surrounding area of points, and their distances from the centroid. Moreover, the sorting means 134 is arranged to weight the flatness ratings based on a distance of each grasp point candidate to the centroid of the segment in which it exists. Accordingly, the sorting means 134 selects a final grasp point. In this way, the final grasp point selected lies in an area of a segment which is flat (in other words, the grasp point candidate and surrounding points are of a relatively low curvature) relative to other grasp point candidates and which is close in distance to the centroid of its respective segment relative to other grasp point candidates. Based on the final grasp point the robot system 3 may grasp the object in the container on the final grasp point.

Figure 5:
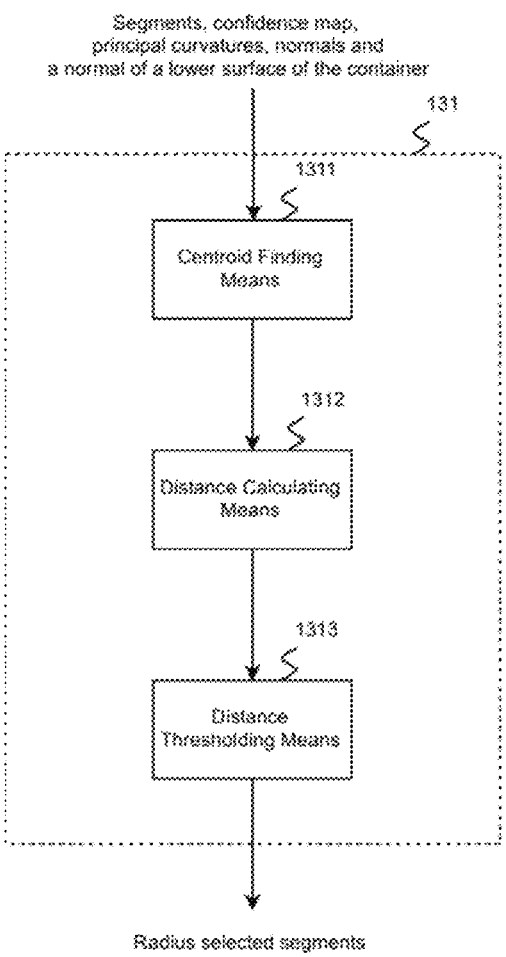
FIG. 5 is a block diagram showing further detail of a radius selecting means of the grasp point calculating means of the controller according to the first embodiment.

FIG. 5 depicts the operation of the radius selecting means 131 which comprises a centroid finding means 1311, a distance calculating means 1312 and a distance thresholding means 1313.

The centroid finding means 1311 is arranged to locate, for each segment, the respective centroid of the segment, which is to say the closest point on the surface of the segment to all points within the segment, with distances measured over the surface of the segment. In an alternative embodiment, the centroid is approximated as the segment point that is closest to the mean of the segment points. This approximation can be computed more efficiently, but gives inaccurate results when the segment is very curved.

The distance calculating means 1312 is arranged to calculate, for each segment, a distance from the centroid to a point on the boundary (or perimeter) of the segment as measured over the surface of the segment (and not the Euclidean distance which corresponds to the straight line distance between two three dimensional points). In this way, the greatest distance between the centroid and the boundary is determined, allowing surfaces that could not possibly be grasped to be discarded. In one non-limiting example, the distance is calculated as a predetermined percentile of all distances from the boundary to the centroid, for example, the 99th percentile distance, where the 100th percentile would be the greatest distance to the boundary. This step may be taken so as to exclude any noise or artefacts present in the organized point cloud, which may result in an erroneously large distance to the centroid.

The distance thresholding means 1313 is arranged to compare, for each segment, the calculated distance between the centroid and the point on the boundary furthest to the centroid to a predetermined radius of the suction cup end effector of the robot system 3. When the distance between the centroid and the point on the boundary furthest to the centroid is greater than the predetermined radius of the suction cup end effector, the distance thresholding means 1313 is arranged to select or retain the segment and outputs it to the candidate calculating means 132. Conversely, when the distance between the centroid and the point on the boundary furthest from the centroid is less than or equal to the predetermined radius of the suction cup end effector, the distance thresholding means 1313 is arranged to discard the segment as being too small to support the operation of the suction cup end effector. As will be appreciated, the suction cup end effector relies on a seal between the edge of the suction cup end effector and the object surface to ensure the suction feature works appropriately to grip the object. Therefore, the distance thresholding means 1313 discards those segments which will not effectively provide this seal due to them being too small in area, which is indicated by the distance from the centroid to a point furthest on the boundary to the centroid. In other words, the use of distance from the centroid to the point furthest to the centroid on the boundary and the radius of the suction cup end effector are used as measurements which are indicative of the area of the segment and area of the suction cup end effector respectively. In this way, the radius selecting means 131 selects those segments whose radius is greater than a predetermined threshold.

Figure 6:
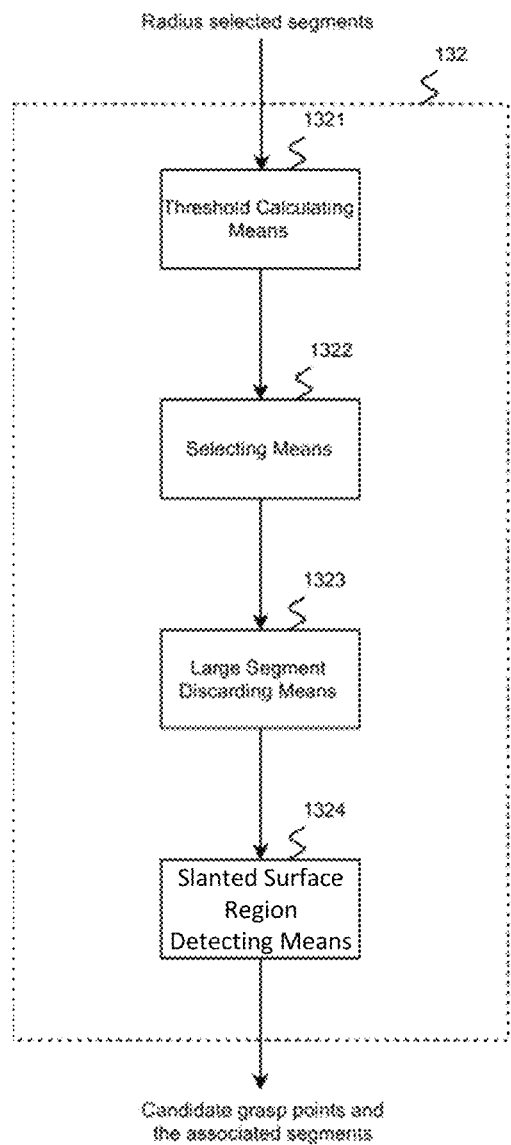
FIG. 6 is a block diagram showing further detail of a candidate calculating means of the grasp point calculating means of the controller according to the first embodiment.

FIG. 6 depicts the operation of the candidate calculating means 132 which comprises a threshold calculating means 1321, selecting means 1322, large segment discarding means 1323 and a slanted surface region detecting means 1324.

In particular, the threshold calculating means 1321 is arranged to calculate a curvature threshold (to be used in the selecting means 1322) based on the principal curvature norms (also referred to as "mean absolute curvature") of the organized point cloud. More specifically, the threshold is determined as a predetermined percentile of all of the principal curvature norms of all segments output from the segmenting means 11. In this way, the calculated threshold is based on the principal curvature norms across all of the segments.

The selecting means 1322 is arranged to operate in a pointwise manner in which individual points of the organized point cloud are assessed against various conditions to determine whether they are viable grasp points known as grasp point candidates. In particular, the selecting means 1322 receives the radius selected segments and determines for each point in each of the selected segments whether the distance of a grasp point candidate to the boundary of the segment in which it lies is greater than a predetermined threshold. In this way, the grasp point is determined to be a certain distance from the edge of the segment, thereby limiting the possibility of a poor grasp operation by the robot system at the edge of a segment. Each principal curvature norm of each grasp point candidate is also compared to the curvature threshold calculated by the threshold calculating means 1321. In particular, if the curvature of the grasp point candidate is less than the curvature threshold then the grasp point candidate is retained as a grasp point candidate. In this way, grasp point candidates which have a low curvature are retained whilst those with high curvatures are discarded.

Moreover, the angle between the normal of each grasp point candidate and the normal of the lower surface of the container is determined. The angle is compared to a predetermined threshold. If the angle is less than the predetermined threshold then the grasp point candidate is retained. In this way, surface regions that are too slanted relative to the normal of the lower surface of the container 4 are discarded. In particular, the normal of the lower surface of the container 4 is also configured to be the same orientation as the orientation of the suction cup end effector of the robot system 3, therefore discarding surface regions that are too slanted minimises the rotation required by the robot system 3, potentially even permitting the suction cup end effector to enter the container 4 parallel to the normal of the lower surface of the container 4, thus eliminating the need to perform path planning (if there are no obstacles restricting access to the container's opening).

Additionally, the distance over the surface from the grasp point candidate to the centroid of the segment in which it lies is determined. If the distance is less than a predetermined threshold then the grasp point candidate is retained. In this way, grasp point candidates which are relatively close to the centroid are retained.

After these tests of each grasp point candidate it is possible that a segment of the radius selected segments may no longer contain any grasp point candidates. In this situation, the selecting means 1322 is arranged to discard the segment in which no grasp point candidates remain.

The large segment discarding means 1323 is arranged to receive the selected grasp point candidates from the selecting means 1322 together with the segment in which each grasp point candidate lies. The large segment discarding means 1323 is arranged to calculate an average, for all selected segments from the selecting means 1322, of a measure of the size of the segments. In one embodiment, the size measure used is the minimum of the distances between the segment's centroid and its boundary points, measured over the surface, and the average is calculated as the median. The calculated size is compared to the calculated average for all segments multiplied by a predetermined factor. When the size of a segment is less than the average for all segments multiplied by the predetermined factor then the segment is maintained. However, when the distance is greater than or equal to the average multiplied by the predetermined factor then the segment is discarded. In this way, unusually large segments are discarded, for example, due to outliers or artefacts in the organized point cloud.

The slanted surface region detecting means 1324 receives the segments selected by the large segment discarding means 1323 and performs a pointwise slanted surface region detection. In particular, the slanted surface region detecting means 1324 is arranged to determine, for each remaining grasp point candidate in the selected segments, the normal of the grasp point candidate. For example, the normals of the grasp point candidates may be retrieved from the previous calculation of them by the principal curvatures and normals calculating means 122 of the surface calculating means 12. The angle between the determined normal and the normal of the lower surface of the container 4 is determined. This operation is similar to the slanted surface region detection performed in the selecting means 1322. However, in the slanted surface region detecting means 1324 a threshold is determined as a percentile of all of the angles of all of the remaining grasp point candidates. When the angle of a particular grasp point candidate is less than the determined threshold then the grasp point candidate is retained. However, when the angle of a particular grasp point candidate is greater than or equal to the determined threshold then the grasp point candidate is discarded. In this way, a more refined slanted surface region detection to that performed in the selecting means 1322 is performed based on a percentile across all angles of all remaining grasp point candidates.

Similar to previous steps, if a particular segment no longer contains any grasp point candidates then that segment is discarded as a potential segment to be grasped by the robot system 3.

Figure 7:
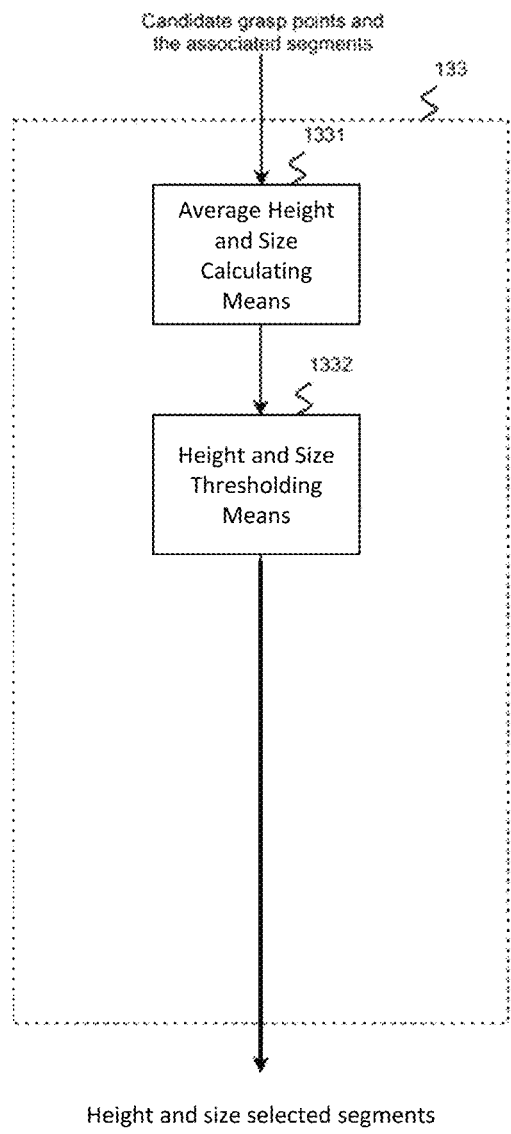
FIG. 7 is a block diagram showing further detail of a size and height selecting means of the grasp point calculating means of the controller according to the first embodiment.

FIG. 7 depicts the operation of the size and height selecting means 133. The size and height selecting means comprises an average height and size calculating means 1331 and a height and size thresholding means 1332.

The average height and size calculating means 1331 is arranged to determine, for each segment output by the selecting means 132, an average height and an average size of the segment's points. In this regard, the height is defined as the distance from the lower surface of the container 4 and hence is the height from the lower surface of the container 4. Alternatively, this height may be referred to as the distance from the lower surface of the container 4. Moreover, although the description has referred to the lower surface of the container 4 it is envisaged to include any surface positioned perpendicularly to the view of the organized point cloud generator 2 so as to provide the organized point cloud generator 2 with a view of the inside of the container and its contents however, it will be appreciated, that other angles of views are envisaged. Instead, the only requirement is that the view includes a view of the interior of the container 4. More specifically, if the view is anywhere within an infinite cone/prism formed by the container's sides (and above the base), then the view will include the container's interior in any orientation, provided that the container remains within the camera's field of view. It's conceivable that the view of the container 4 may be at an angle to each other. The size can be determined as the minimum of the distances between the segment's centroid and its boundary points, measured over the surface, and the average may be calculated as the median.

In a preferred embodiment, the average is determined as the median height of the segment's points and the median size of the segment's points. Moreover, the average height and size calculating means 1331 is arranged to, for each segment, determine the average height of the segment's points and the average size of the segment's points. In a preferred embodiment the average is determined as the median height and the median size.

The height and size thresholding means 1332 is arranged to compare the average height of the segment points with a percentile (of predetermined rank) of these average heights, calculated with respect to the remaining segments selected by the large segment discarding means 1323. Moreover, the average size of the segments selected by the height and size thresholding means 1332 is compared with the calculated average for all segments multiplied by a predetermined factor.

When the average height of a segment's points exceeds the percentile then the segment is maintained. Moreover, when the average size of the grasp point candidates in each segment exceeds a predetermined percentile of the average size in all of the remaining segments selected by the height and size thresholding means 1332 then the segment is maintained.

However, when both the average height of the segment's points is less than or equal to the percentile and when the average size of the segment's points is less than or equal to the percentile then the segment is discarded. In this way the segments closest to the top of the container 4 (those segments furthest from the lower surface of the container 4) which are greater than a certain size are selected. In other words, segments which are both too low and too small then the segment is discarded.

Figure 8:
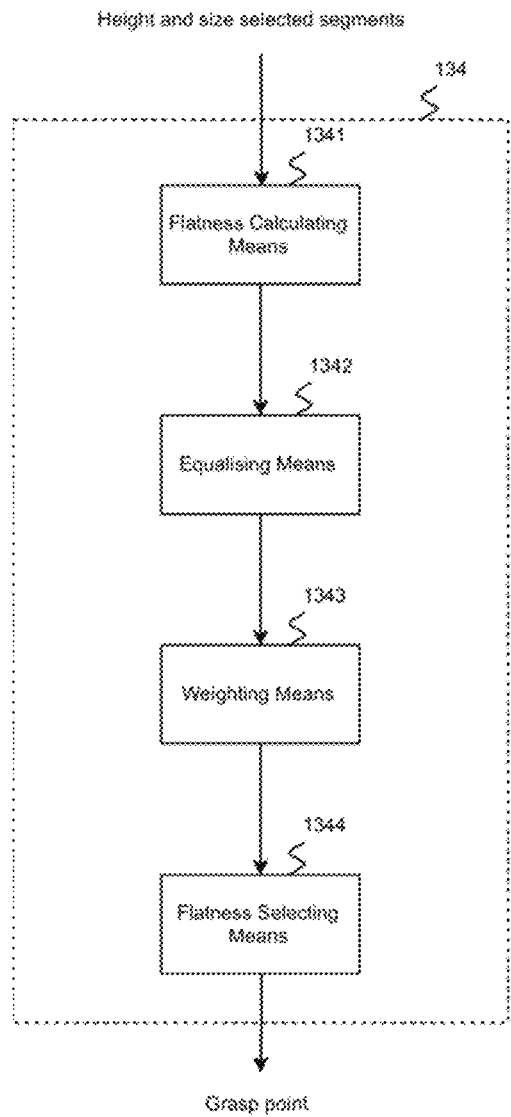
FIG. 8 is a block diagram showing further detail of a sorting means of the grasp point calculating means of the controller according to the first embodiment.

FIG. 8 depicts the operation of sorting means 134. The sorting means 134 comprises a flatness calculating means 1341, an equalising means 1342, a weighting means 1343 and a flatness selecting means 1344.

The flatness calculating means 1341 is arranged to determine a flatness rating for a subset of the remaining grasp point candidates in the remaining segments selected by the average height and size selecting means 133. To determine the flatness rating a subset of the grasp point candidates is generated for each segment based on the criteria that the points are randomly generated to be as far away from other points as possible. In this way, the calculation intensity of the flatness calculating means 1341 can be minimised by operating on a smaller number of grasp point candidates, whilst still providing sufficiently dense measures of the flatness at various points in the segment. The flatness rating for each point within the grasp point candidate subset is generated based on a principal curvature norm (also referred to as "mean absolute curvature" and as used in the candidate calculating means 132) at each point in the segment and the distances between the grasp point candidate and the segment points. In an alternative embodiment, the flatness rating for each grasp point candidate within the subset is generated based on a principal curvature norm at each point in the segment and the shortest path lengths between the grasp point candidate and the segment points. In this way, a flatness rating for each point within the grasp point candidate subset is calculated based on the neighborhood flatness, with those points of the segment with the greatest distance from the grasp point candidate having the least effect on the calculated flatness rating and those points closer to the grasp point candidate having the most effect.

The equalising means 1342 is arranged to adjust the distribution of flatness ratings of all of the candidate grasp point subsets, so that the effect of these ratings will not dwarf or be dwarfed by the weighting means 1343. For example, in one embodiment, the flatness ratings could be replaced by their percentile rank, so that a value of 100% indicates a neighborhood which is flat, whilst a value of 0% would indicate a neighborhood which exhibits maximal curvature (compared to all other neighborhoods), and an intermediate value indicates a neighborhood with intermediate curvature.

The weighting means 1343 is arranged to weight the equalized flatness ratings based on each grasp point candidate's distance from the centroid of the segment in which it lies. In this way, those grasp point candidates closer to the centroid of the segment in which they lie are weighted more highly because grasping an object from a point closer to its centre of mass (and typically closer to the centroid of a segment) makes it easier to grasp by the robot system 3.

The selecting means 1344 is arranged to select the final grasp point to be utilised by robot system 3. In one example, the selecting means 1344 may select the grasp point candidate with the highest weighted equalized flatness rating, in other words, that grasp point which features a rating which tends to be closer to the centroid, with a flatter neighborhood.

In summary, the sorting means 134 determines a grasp point based on the neighborhood flatness of each grasp point candidates and its proximity to the centroid of the segment. Accordingly, the selected grasp point is optimised for use with the suction cup end effector.

Figure 9:
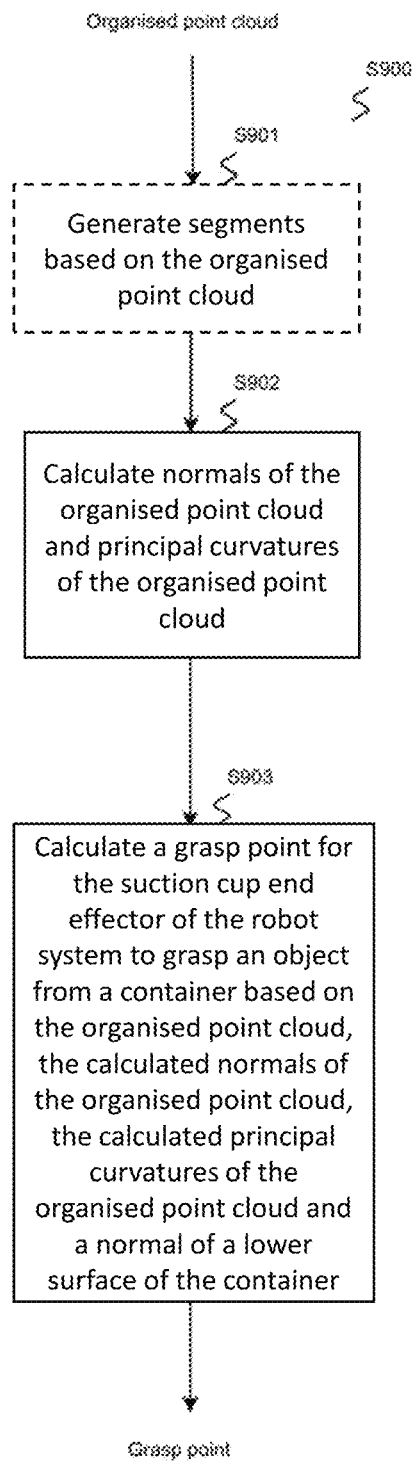
FIG. 9 is a flowchart showing the processes performed by the controller according to the first embodiment shown in FIG. 1.

FIG. 9 shows the processes performed by the controller 1 according to the first embodiment as shown in FIG. 1. In particular, the flowchart shows the generation of a grasp point based on input organized point cloud information.

Referring to FIG. 9, at the optional step S901 the segmenting means 11 optionally generates segments based on a received organized point cloud from the organized point cloud generator 2. The organized point cloud is a representative of the scene viewed by the organized point cloud generator 2, typically of the container 4 containing objects. The organized point cloud provides information of the distance of the container 4 and objects from the organized point cloud generator 2, in other words depth information about the scene. The segments indicate segmented surfaces determined by the segmenting means 11. In this way the segmenting means 11 breaks the scene viewed by the organized point cloud generator 2 into separate objects and further into separate surfaces of those objects.

In the following descriptions, for simplicity, it will be assumed that the step S901 is utilised to generate segments of the organized point cloud. However, it need not be used and instead the entire scene as generated by the organized point cloud generator may be treated as a single segment/segmented surface. In this way, valid grasp points for the robot system 3 may still be generated but without the distinction between separate objects in the container 4 which is a feature provided by the step S901.

At step S902, the surface calculating means 12 receives the organized point cloud from the organized point cloud generator 2 and calculates information about the scene of the organized point cloud. In particular, the surface calculating means 12 calculates normals of the organized point cloud and principal curvatures of the organized point cloud.

Optionally, the surface calculating means 12 further calculates a smoothed organized point cloud.

In the following descriptions, for simplicity, it will be assumed that the step S902 is utilised to generate a smooth organized point cloud. However, it need not be generated and instead the generated, un-smoothed, organized point cloud may be used and treated to be smooth enough for the generated of grasp points. Using an unsmooth organized point cloud will still generate valid grasp points for the robot system 3, however, in some instances artefacts in the organized point cloud may be exist which would otherwise be smoothed out.

At step S903, the grasp point calculating means 13 receives the optional segments generated by the segmenting means 11 and the information about the scene calculated by the surface calculating means 12. Based on the received information, the grasp point calculating means 11 calculates a grasp point for a suction cup end effector of a robot system to grasp at least one object from the container 4.

In some instances, the grasp point calculating means 13 will be unable to calculate a grasp point. In this situation, the method performs one or both of the following steps: the method generates an indication that the container 4 is empty, and/or re-calculates a grasp point with at least one segment generated by the segmenting means 11 disregarding. In other words, the grasp point calculation is performed again without all of the information received from the segmenting means 11.

In summary, it will be understood from the description of the first embodiment that the grasp point calculation is performed based on pertinent information about the segmented surfaces (the segments), in particular, the normals of the point cloud, a smoothed organized point cloud and the calculated principal curvatures of the organized point cloud. In this way, the suction end effector is configured to operate on segments which are optimally placed for grasping, for example, those positions on segments which are minimally curved to ensure a good grasp is achieved.

Figure 10:
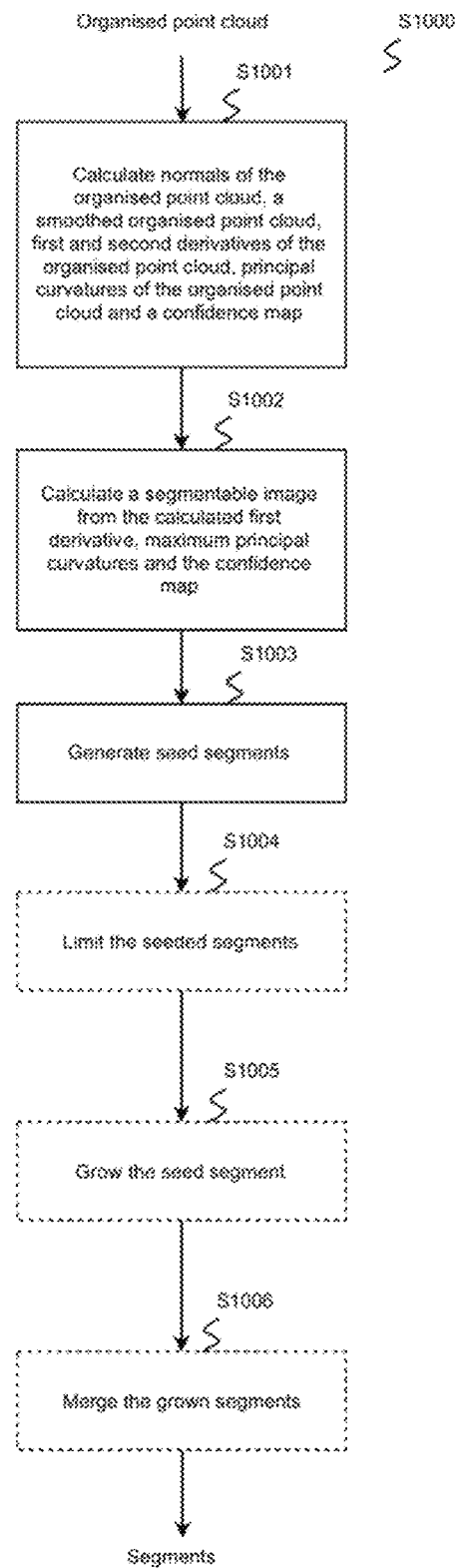
FIG. 10 is a flowchart showing the processes performed by the segmenting means shown in FIG. 2.

FIG. 10 shows the processes performed by the segmenting means 11 as shown in FIG. 2. In particular, the flowchart shows the generation of a segments based on input organized point cloud information.

Referring to FIG. 10, at step S1001, the segmenting means 11 receives the organized point cloud from the organized point cloud generator 2. The segmenting means 11 calculates normals of the organized point cloud, an optional smoothed point cloud, first and second derivatives of the organized point cloud, principal curvatures of the organized point cloud and a confidence map based on the organized point cloud. In one implementation, step S1001 calculates the properties of the organized point cloud by fitting polynomials to one-dimensional slices of the organized point cloud windows of a predetermined radius.

At step S1002, a segmentable image is calculated based on the information calculated in step S1001. The segmentable image may be binary image highlighting the point cloud valleys. In one implementation, the segmentable image may be calculated as the pixelwise product of three images. More specifically, the three images may be an equalized negation of the maximum principal curvatures image, an equalized negation of the depth map gradient norms and a pixel wise power of a confidence map. The equalized negation of the maximum principal curvatures image may be an image that has values close to zero in the point cloud valleys and values close to one at peaks. The equalized negation of the depth map gradient norms may be an image than has values close to zero on steep surfaces and values close to one on horizontal surfaces.

At step S1003, seed segments are generated based on the segmentable image by comparing pixel values in the segmentable image to a predetermined threshold. Step S1003 also fills in any gaps in the generated seed segments to ensure consistent surfaces. In some embodiments, the output of step S1003 are used as the segments upon which to perform grasp point calculation.

An optional step S1004 may be performed to limit the seeded segments based on a mask so as to define boundaries for each segment. Step S1004 imposes limits on the boundary of each segment beyond which the segments can't be grown An optional step S1005 may be performed. At step S1005, the seeded (and optionally limited) segments are grown. In particular, the segments are grown until pixels can no longer be added to all of the segments.

An optional step S1006 may be performed. At step S1006, the grown segments are merged, where appropriate. In particular, segments are merged when two conditions are met. More specifically, the first condition is met when the ratio between a length of an interface of two grown segments to the length of the perimeters of the two grown segments is greater than a predetermined threshold. The second condition is met when a distribution of image values along the interface is similar to a distribution of image values within both of the segments.

In summary, the method S1000 advantageously performs segmentation of an organized point cloud based on information about the organized point cloud, specifically, first and second derivatives and principal curvatures of the organized point cloud. This leads to a more effective segmentation.

Figure 11:
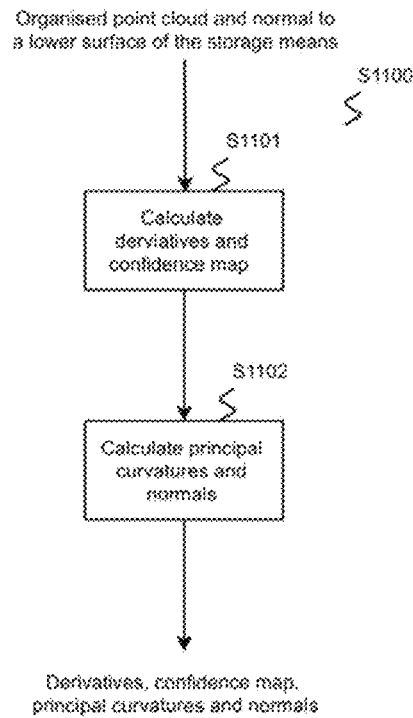
FIG. 11 is a flowchart showing the processes performed by the surface calculating means shown in FIG. 3.

FIG. 11 shows the processes performed by the surface calculating means 12 as shown in FIG. 3. In particular, the flowchart shows the generation of derivatives, a confidence map, principal curvatures and normals of the input organized point cloud information.

Referring to FIG. 11, at step S1101, the surface calculating means 12 receives the organized point cloud generated by the organized point cloud generator 2 together with an indication of a normal of a lower surface of the container 4. The surface calculating means 12 calculates derivatives and a confidence map of the organized point cloud. In one non-limiting implementation, S1101 fits one-dimensional slices of the organized point cloud, subdivided into overlapping windows where each window is of a predetermined radius.

At step S1102, the calculated derivatives and confidence map are used to calculate principal curvatures and normals. In particular, the principal curvatures are calculated based on the normal of each point and a first fundamental form.

In summary, method S1100 calculates various properties of the organized point cloud, in particular, properties of the surfaces determined from the organized point cloud.

Figure 12:
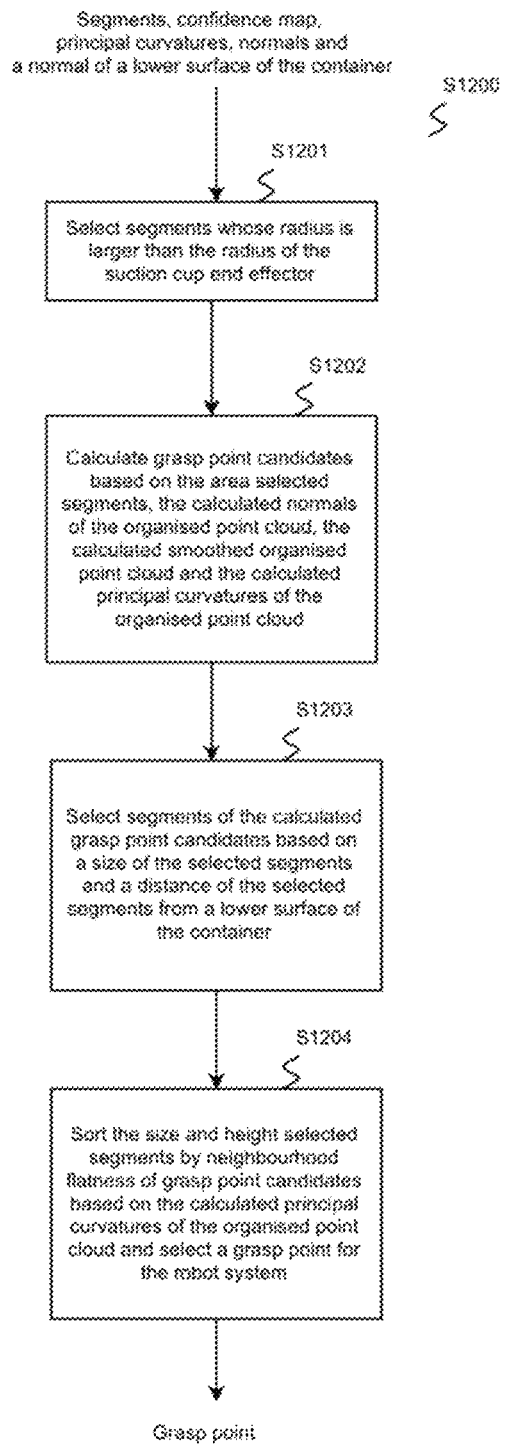
FIG. 12 is a flowchart showing the processes performed by the grasp point calculating means shown in FIG. 4.

FIG. 12 shows the processes performed by the grasp point calculating means 13 as shown in FIG. 4. In particular, the flowchart shows the generation of a grasp point based on input segments and properties of the surfaces of the segments, such as the confidence map, principal curvatures, normals of the organized point cloud and a normal of a bottom surface of the container 4.

Referring to FIG. 12, at step S1201, the grasp point calculating means 13 receives the segments generated by the segmenting means 11 and the properties of the organized point cloud calculated by the surface calculating means 12. Based on the received information S1202 selects those segments whose radius is larger than the radius of the suction end effector. In this way, small segments are discarded, in other words those segments unable to support the suction cup end effector are discarded.

At step S1202, the radius selected segments are received. A point of the organized point cloud in the radius selected segments is selected when various conditions are matched. In particular, each point, known as a grasp point candidate, is calculated based on the properties of the surface calculated in S1100. S1202 thereby outputs both the grasp point candidates matching the conditions together with the segments in which they lie.

At step S1203, the segments output from S1202 are selected based on the size of segment and its distance from the lower surface of the container. In this regard, the distance from the lower surface of the container is the complement of the distance from the organized point cloud generator 2. Accordingly, it is advantageous to select those segments which are closer to the organized point cloud generator 2, and hence which are furthest from the lower surface of the container 4. Moreover, segments with a size greater than a predetermined threshold are selected.

At step S1204, the grasp point candidates in the segments selected in step S1203 are sorted by neighborhood flatness and distance of the grasp point candidate from the centroid of the segment. In one implementation, the grasp point candidate with the maximal value is selected as the grasp point for the robot system 3.

In summary, S1200 selects a grasp point which lies in an area of local flatness and, preferably, close to the centroid location in that segment. Moreover, due to step S1202 the grasp point matches various conditions, such as distance from the edge of the segment and angle relative to the robot system 3.

Figure 13:
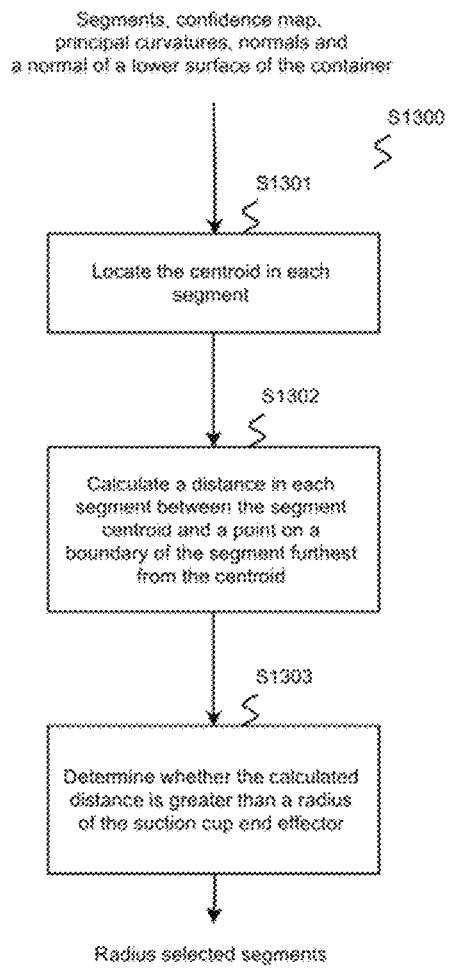
FIG. 13 is a flowchart showing the processes performed by the radius selecting means shown in FIG. 5.

FIG. 13 shows the processes performed by the radius selecting means 131 as shown in FIG. 5. In particular, the flowchart shows the generation of radius selected segments based on input segments and properties of the surfaces of the segments, such as the confidence map, principal curvatures and normals.

Referring to FIG. 13, at step S1301, the radius selecting means 131 receives the segments together with information about the surface of segments as determined by the surface calculating means 12. Based on this information, step S1301 finds the location of the centroid in each segment, which is to say the closest point on the surface of the segment to all points within the segment, with distances measured over the surface of the segment. In an alternative embodiment, the centroid is approximated as the segment point that is closest to the mean of the segment points. This approximation can be computed more efficiently, but gives inaccurate results when the segment is very curved.

At step S1302, the distance between the centroid of the segment and a point on the boundary of the segment furthest to the centroid is calculated. The distance is indicative of the area of the segment.

At step S1303, the distance calculated in S1302 is compared to the known radius of the suction cup end effector. In particular, the segment is selected when the distance calculated in S1302 is greater than the known radius of the suction cup end effector. Otherwise, the segment is discarded.

In summary, S1300 removes those segments which are too small to successfully support grasping by the suction cup end effector. Instead, S1300 selects those segments with a radius sufficient to support the suction cup end effector.

Figure 14:
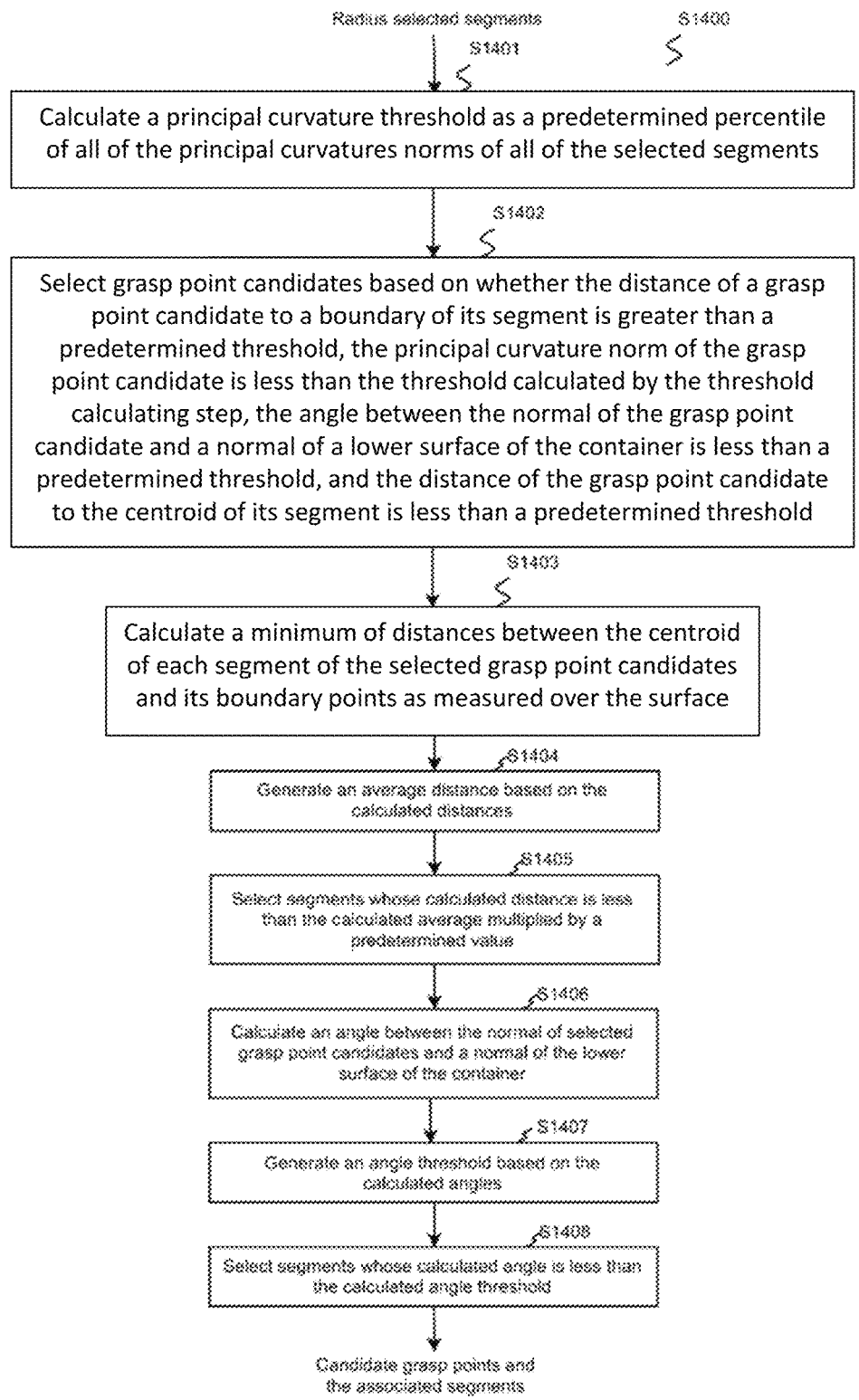
FIG. 14 is a flowchart showing the processes performed by the candidate calculating means shown in FIG. 6.

FIG. 14 shows the processes performed by the candidate calculating means 132 as shown in FIG. 6. In particular, the flowchart shows the generation of grasp point candidates and their associated segments based on input radius selected segments.

Referring to FIG. 14, at step S1401, a principal curvature threshold is calculated for all of the grasp point candidates in the radius selected segments received from step S1401. In particular, the threshold is calculated based on a particular percentiles of the principal curvature norms of all of the segments.

At step S1402, pointwise operation on the grasp point candidates is performed. In particular, a grasp point candidate is selected for step S1403 when a number of conditions is met. In particular, the distance of the grasp point candidates to a boundary of the segment in which it lies is greater than a predetermined threshold. Moreover, the principal curvature norms of the grasp point candidate is less than the threshold calculated in step S1401. The angle between the normal of the grasp point candidate and a normal of a lower surface of container 4 is less than a predetermined threshold. In addition, the distance of the grasp point candidate to the centroid of its segment is less than a predetermined threshold. As will be appreciated, any combination of these conditions may be implemented and some may not be performed depending on the particular set up of equipment. The grasp point candidates that do not meet the conditions implemented are discarded.

It is also to be appreciated, that due to the conditions implemented, no grasp point candidates in a particular segment may remain. Accordingly, segments not containing any grasp point candidates are discarded.

At step S1403, a minimum of distances between the centroid of each segment selected by S1402 and its boundary points as measured over the surface is calculated.

As step S1404, an average of the distances calculated in S1403 is determined. In a preferred embodiment, the distance is calculated as the median.

At step S1405, segments are selected whose calculated distance is less than the average calculated in S1404 multiplied by a predetermined value. In this way, those segments which are deemed to be unusually large are discarded and only those segments which are deemed to be of a reasonable size are selected. In this way, artefacts in the organized point cloud which cause the generation of overly large segments is effectively mitigated.

At step S1406, an angle between the normal of the grasp point candidates in the segments selected at step S1405 and a normal of the lower surface of the container 4 is calculated.

At step S1407, an angle threshold is calculated based on the angles calculated in step S1406.

At step S1408, segments are selected whose calculated angle is less than the angle threshold calculated in step S1407. In this way, surfaces which are slanted relative to all of the selected segments are discarded. Otherwise, the segment is selected together with the grasp point candidates selected within those selected segments.

In summary, S1400 effectively selects those options for grasp point candidates from the radius selected segments. In this way, the selected grasp point candidates are in locations and at angle which make grasping effective via the suction cup end effector.

Figure 15:
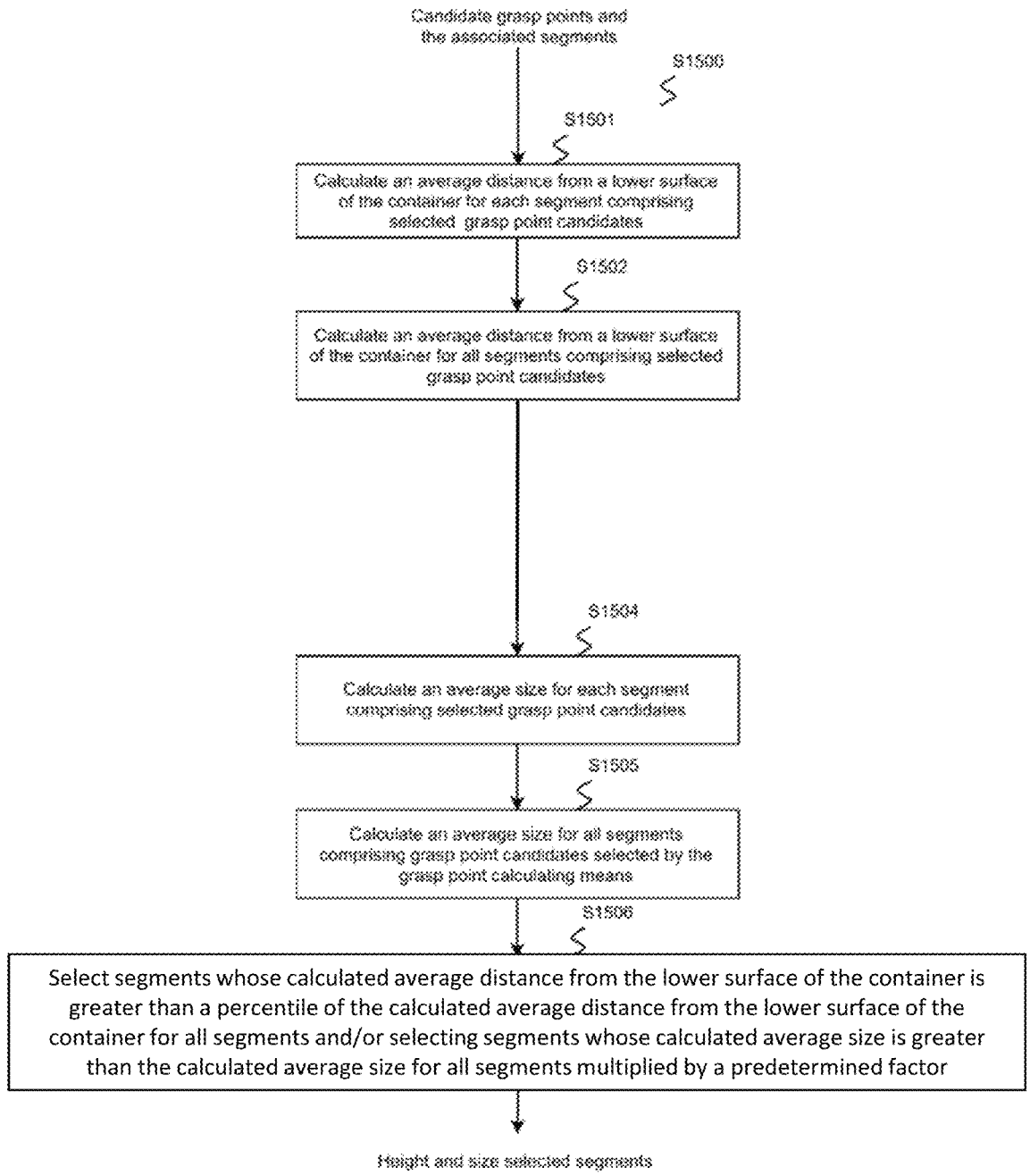
FIG. 15 is a flowchart showing the processes performed by the size and height selecting means shown in FIG. 7.

FIG. 15 shows the processes performed by the size and height selecting means 133 as shown in FIG. 7. In particular, the flowchart shows the generation of height and size selected segments based on input grasp point candidates and their associated segments.

Referring to FIG. 15, at step S1501, the size and height selecting means 133 receives the grasp point candidates and the segments in which they lie from the candidate calculating means 132. Step S1501 calculates an average distance from a lower surface of the container for each received segment. In a preferred embodiment the average is calculated as the median.

At step S1502, based on the calculated average for each segment in step S1501, step S1502 calculates an average for all received segments.

At step S1504, the size and height selecting means 133 calculates an average size for each received segment.

At step S1505, the height and size selecting means 133 calculates an average of all of the segments based on the segments received from step S1504. In a preferred embodiment the average is calculated as the median.

At step S1506, the size and height selecting means 133 selects the segments whose average distance from the lower surface of the container 4 is greater than a percentile of the calculated average distance for all of the segments and/or the segments whose average size is greater than a predetermined percentile of the calculated average size for all of the segments multiplied by a predetermined factor.

In this way, the selected segments are at a predetermined percentile of the heights of the selected segments in the container 4 and/or a predetermined percentile of the sizes of the selected segments in the container 4 multiplied by a predetermined factor.

Figure 16:
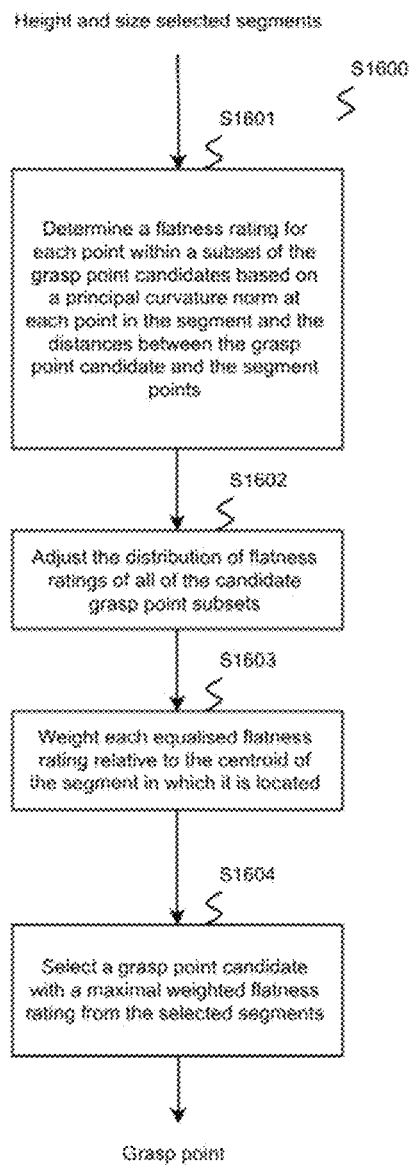
FIG. 16 is a flowchart showing the processes performed by the sorting means shown in FIG. 8.

FIG. 16 shows the processes performed by the sorting means 134 as shown in FIG. 8. In particular, the flowchart shows the generation of a grasp point based on input height and size selected segments.

Referring to FIG. 16, at step S1601, the sorting means 134 receives the height and size selected segments together with the grasp point candidates which lie in the selected segments as calculated by the candidate calculating means 132. The sorting means 134 determines a flatness rating using a subset of the grasp point candidates. The subset of the grasp point candidates is generated to be as far away from each other as possible and comprise a random sampling of the grasp point candidates in each segment. The flatness rating for each point within the grasp point candidate subset is generated based on a principal curvature norm at each point in the segment and the distances between the grasp point candidate and the segment points. The distance may be calculated as the three dimensional distance from the grasp point candidate to the segment point or as the distance over the surface of the segment. Accordingly a flatness rating is generated for each grasp point candidate based on the flatness of its local area.

At step S1602, the distribution of flatness ratings calculated in step S1601 is adjusted for all of the candidate grasp point subsets, so that the effect of these ratings will not dwarf or be dwarfed by the weighting step S1603.

At step S1603, the equalized flatness ratings are weighted relative to the distance of the grasp point candidate to the centroid of the segment in which it lies.

At step S1604, the weighted flatness ratings are sorted and the grasp point candidate with the maximal rating is selected as the grasp point for the robot system 3.

Modifications and Variations

Many modifications and variations can be made to the embodiments described above, without departing from the scope of the present invention.

As will be appreciated, a container 4 may be envisaged in a number of different forms. For example, the container 4 may be a tote or a crate. A container 4 is merely a means for storing objects, it will typically have walls but in some instances this is not the case. For example, if the objects to be contained are generally flat and easily stack then walls need not be required and hence the container 4 will be a pallet on which to stack objects to be grasped by the robot system 3. In the form of a pallet, only the lower surface of the container 4, as referred to throughout the description, would be present with no walls extending therefrom. Therefore, the container 4 is envisaged to be any storage means arranged to store at least one object.

With regard to the radius selecting means 131 and step S1201, the present inventors also considered an alternative implementation that, unlike the radius selecting means 131 and step S1201, is able to distinguish between convex segments that are too thin to grasp and concave segments that have both regions that are large enough to grasp and regions that are too thin to grasp. In the alternative implementation, instead of measuring distances from the boundary points to the centroid over the segment surface, distances from each segment point to the closest boundary point of the segment are measured over the segment surface instead, and segments are discarded when the maximum of these distances is less than the suction cup end effector radius.

Although the grasp point calculating means 13 has been described with a linear flow of operations from one unit to another in a specified order, the present inventors envisage that the order of operations can be performed in many different combinations and with slight modifications depending on choice of implementation. For example, FIG. 4 shows the radius selecting means before the candidate calculating means. However, it is envisaged that the radius selecting means could be performed after the candidate calculating means. Similarly, the size and height selecting means could be performed before the radius selecting means. As will be appreciated, the order of operations regarding the selection of grasp point candidates is not limited and any order which is suitably convenient is envisaged.

Moreover, the sorting means 134 is arranged to sort by the weighted equalized flatness rating. Although this is one option, it is also equally possible to sort by a different criteria and to employ the weighted equalized flatness rating in another means. For example, the sorting means 134 may be arranged to select the grasp point candidate with the highest weighted equalized flatness rating. In one non-limiting example, the candidate selecting means 132 could be further arranged to determine a weighted equalized flatness rating for each grasp point candidate and then to compare the weighted equalized flatness rating to a predetermined threshold. The predetermined threshold could be an absolute threshold or a relative threshold based on a percentile of the combined weighted equalized flatness ratings of all of the segments. In this way, grasp point candidates with weighted equalized flatness ratings greater than a percentile of the average weighted equalized flatness rating could be selected as grasp point candidates to retain. Alternatively, the predetermined threshold could be based on the average weighted equalized flatness rating of each segment. In this way, segments with high average weighted equalized flatness ratings could be retained, and the rest could be discarded. In this case, when an absolute threshold is used, it is compared to the averages.

Moreover, the size and height selecting means 132 could be arranged to not perform selection of segments based on size or height. Instead, it could be arranged to rate each grasp point candidate according to the sum of normalised measures of the size of the containing segment and the height of the grasp point candidate. The normalisation could be performed by histogram equalisation, as described earlier, and the relative contribution of the size and height terms of the sums could be controlled by a weighting factor. The sorting means could then be arranged to select the grasp point candidate with the highest rank, so as give preference to high points in large segments, whilst also permitting lower grasp points in large segments, and high grasp points in small segments. As will be appreciated, in this example, the flatness rating was performed without sorting, in a different means to the sorting means 134, and the sorting was performed based on height. As can be seen, the present inventors have envisaged an order of operations which is different to that described above. However, advantageously, the order of operations described throughout the description provides operations which are computationally less expensive because the flatness rating calculation is best performed on the fewest grasp point candidates because it is the most computationally expensive. Accordingly, the present inventors implement the flatness rating calculate at the end of grasp point calculation in the sorting means 134 because this is the location with the fewest grasp point candidates remaining, many grasp point candidates have been discarded by the radius selecting means 131, candidate calculating means 132 and size and height selecting means 133.

In one example, the controller 1 of the first embodiment, the organized point cloud generator 2 and robot system 3 may be implemented in a grocery shopping packing system arranged to move objects from a container containing many objects which are the same product into another container containing the shopping for the customer comprising many different products.

Online retail businesses selling multiple product lines, such as online grocers and supermarkets, require systems that are able to store tens or even hundreds of thousands of different product lines. The use of single-product stacks in such cases can be impractical, since a very large floor area would be required to accommodate all of the stacks required. Furthermore, it can be desirable only to store small quantities of some items, such as perishables or infrequently-ordered goods, making single-product stacks an inefficient solution.

International patent application WO 98/049075A (Autostore), the contents of which are incorporated herein by reference, describes a system in which multi-product stacks of containers are arranged within a frame structure.

PCT Publication No. WO2015/185628A (Ocado) describes a further known storage and fulfilment system in which stacks of bins or containers are arranged within a framework structure. The bins or containers are accessed by load handling devices operative on tracks located on the top of the frame structure. The load handling devices lift bins or containers out from the stacks, multiple load handling devices co-operating to access bins or containers located in the lowest positions of the stack. A system of this type is illustrated schematically in FIGS. 17 to 20 of the accompanying drawings.

Figure 17:
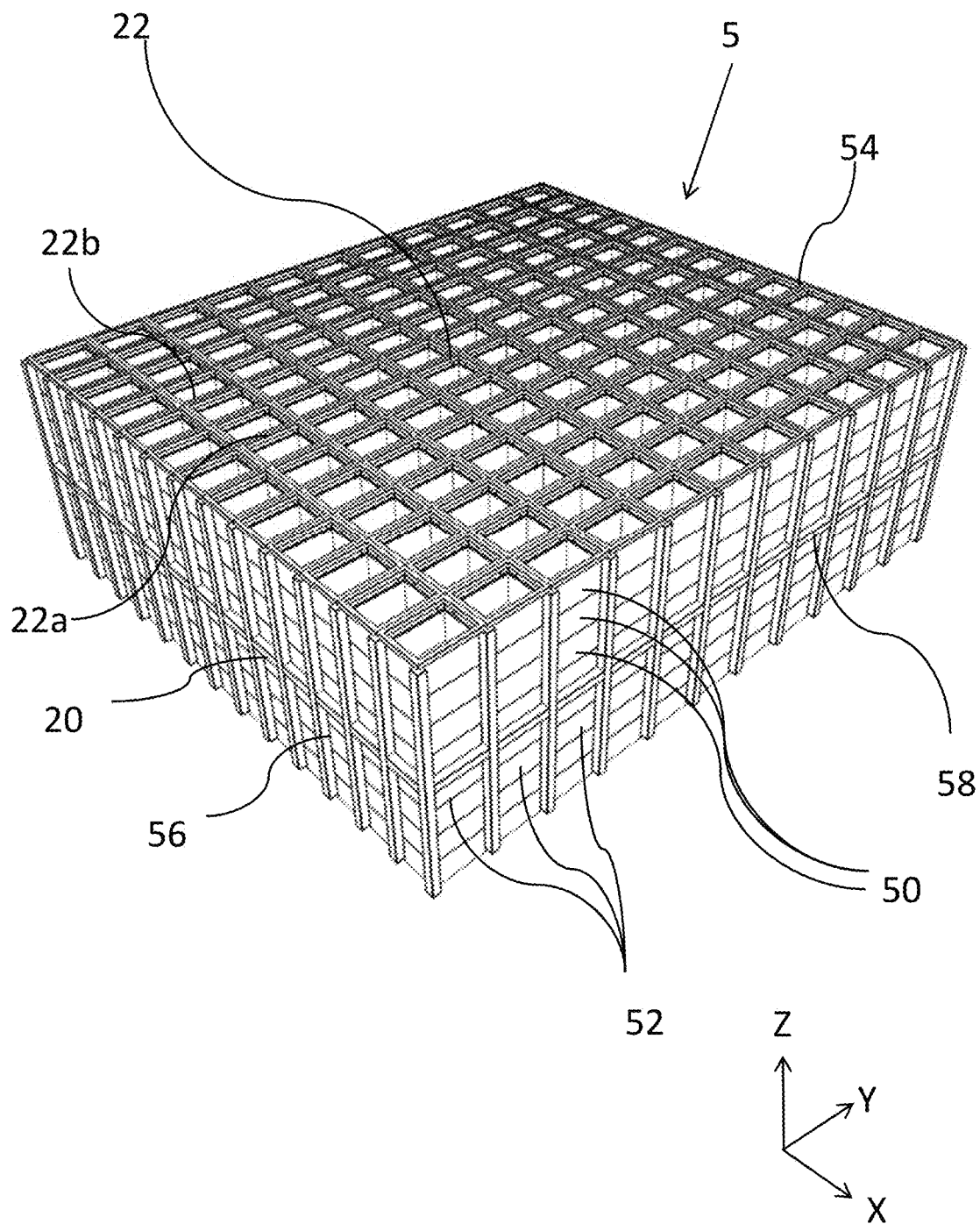
FIG. 17 is a schematic diagram of a framework structure according to a known system.
Figure 18:
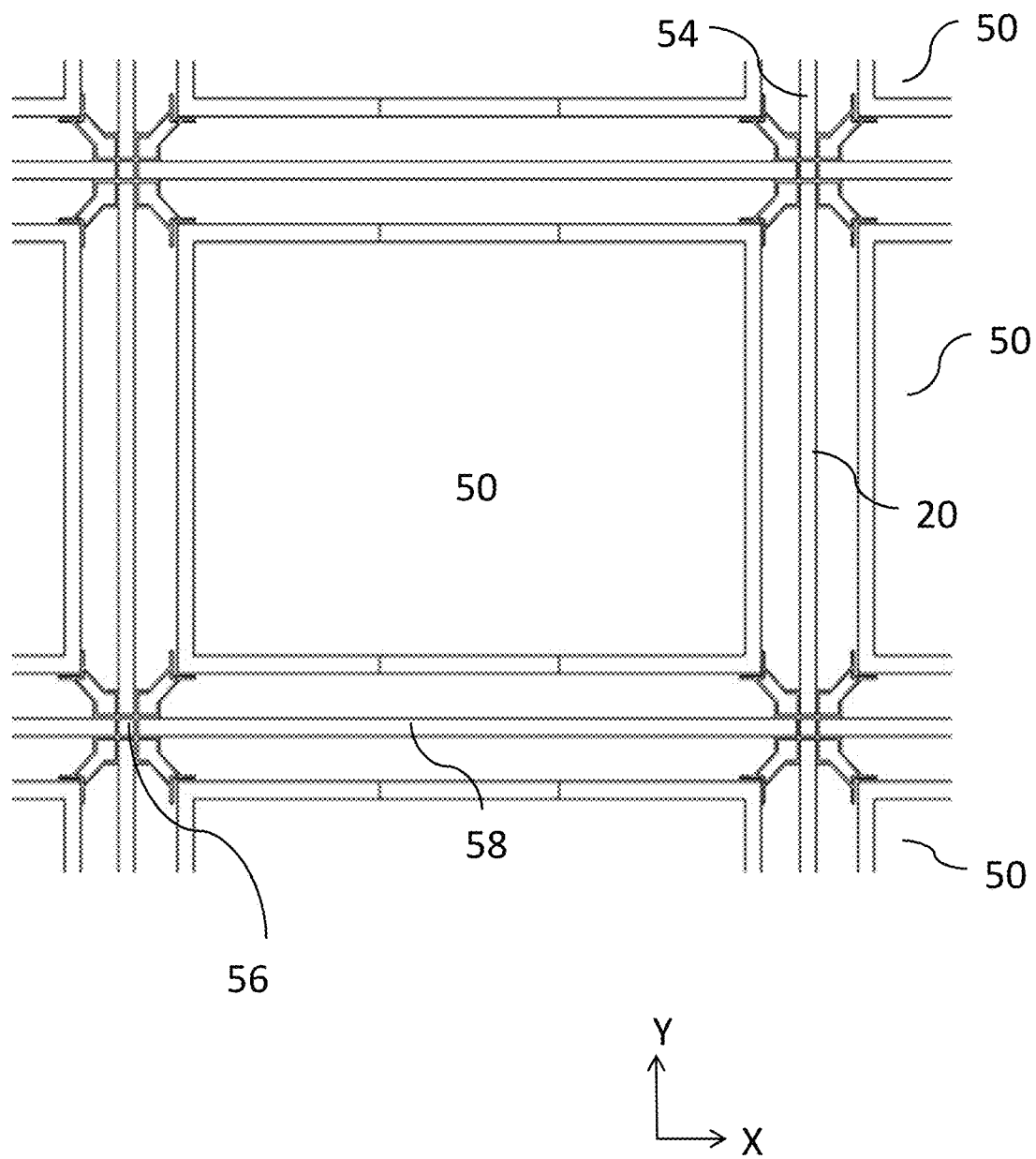
FIG. 18 is a schematic diagram of a top-down view showing a stack of bins arranged within the framework structure of FIG. 17.

As shown in FIGS. 17 and 18, stackable containers, known as bins 50, are stacked on top of one another to form stacks 52. The stacks 52 are arranged in a grid framework structure 54 in a warehousing or manufacturing environment. FIG. 17 is a schematic perspective view of the framework structure 54, and FIG. 18 is a top-down view showing a stack 52 of bins 50 arranged within the framework structure 54. Each bin 50 typically holds a plurality of product items (not shown), and the product items within a bin 50 may be identical, or may be of different product types depending on the application.

The framework structure 54 comprises a plurality of upright members 56 that support horizontal members 58, 20. A first set of parallel horizontal members 58 is arranged perpendicularly to a second set of parallel horizontal members 20 to form a plurality of horizontal grid structures supported by the upright members 56. The members 56, 58, 20 are typically manufactured from metal. The bins 50 are stacked between the members 56, 58, 20 of the framework structure 54, so that the framework structure 54 guards against horizontal movement of the stacks 52 of bins 50, and guides vertical movement of the bins 50.

Figures 19A, 19B, 19C:
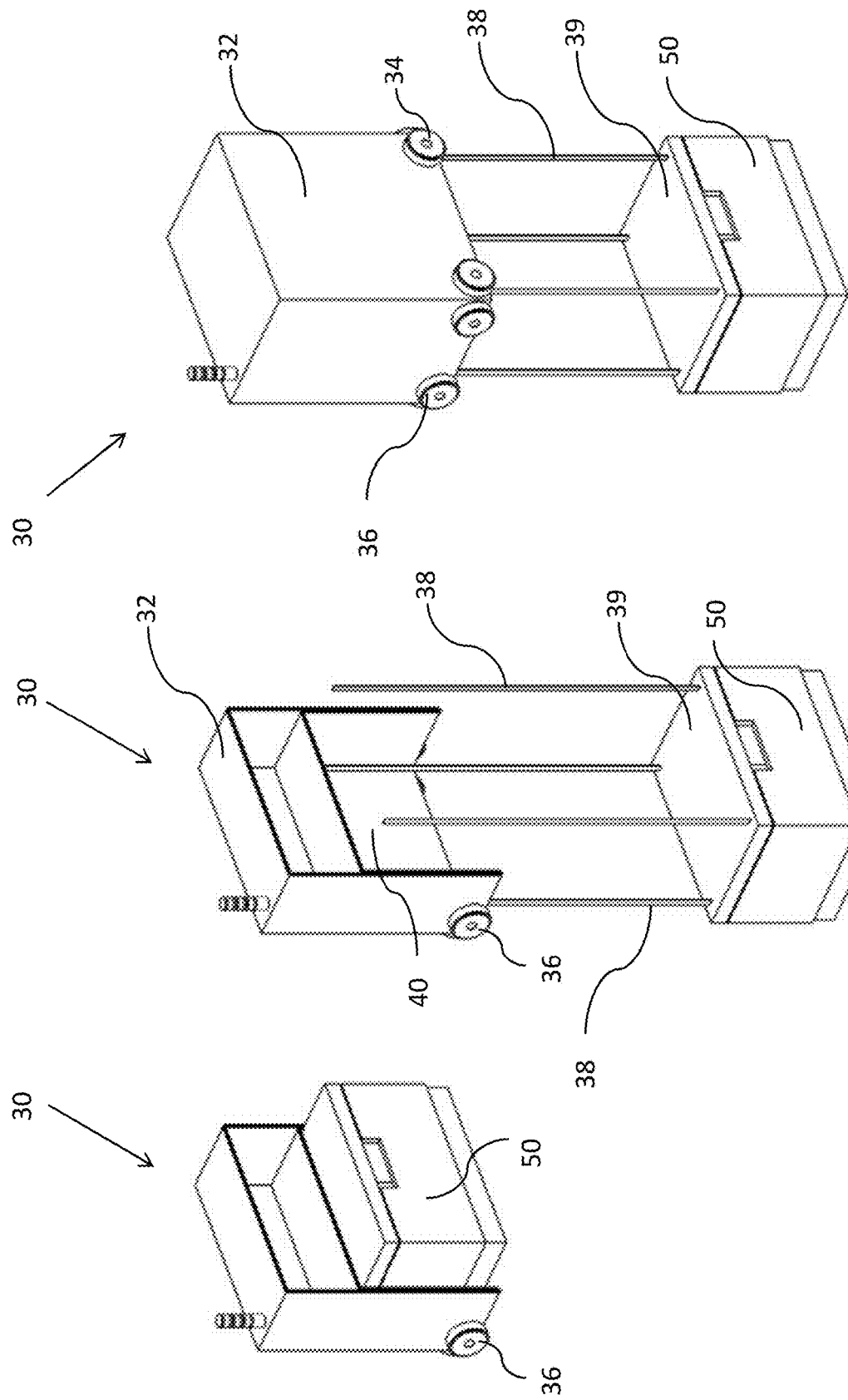
FIGS. 19(a) and 19(b) are schematic perspective views of a load handling device depositing a bin and FIG. 19(c) is a schematic front perspective view of a load handling device lifting a bin.
Figure 20:
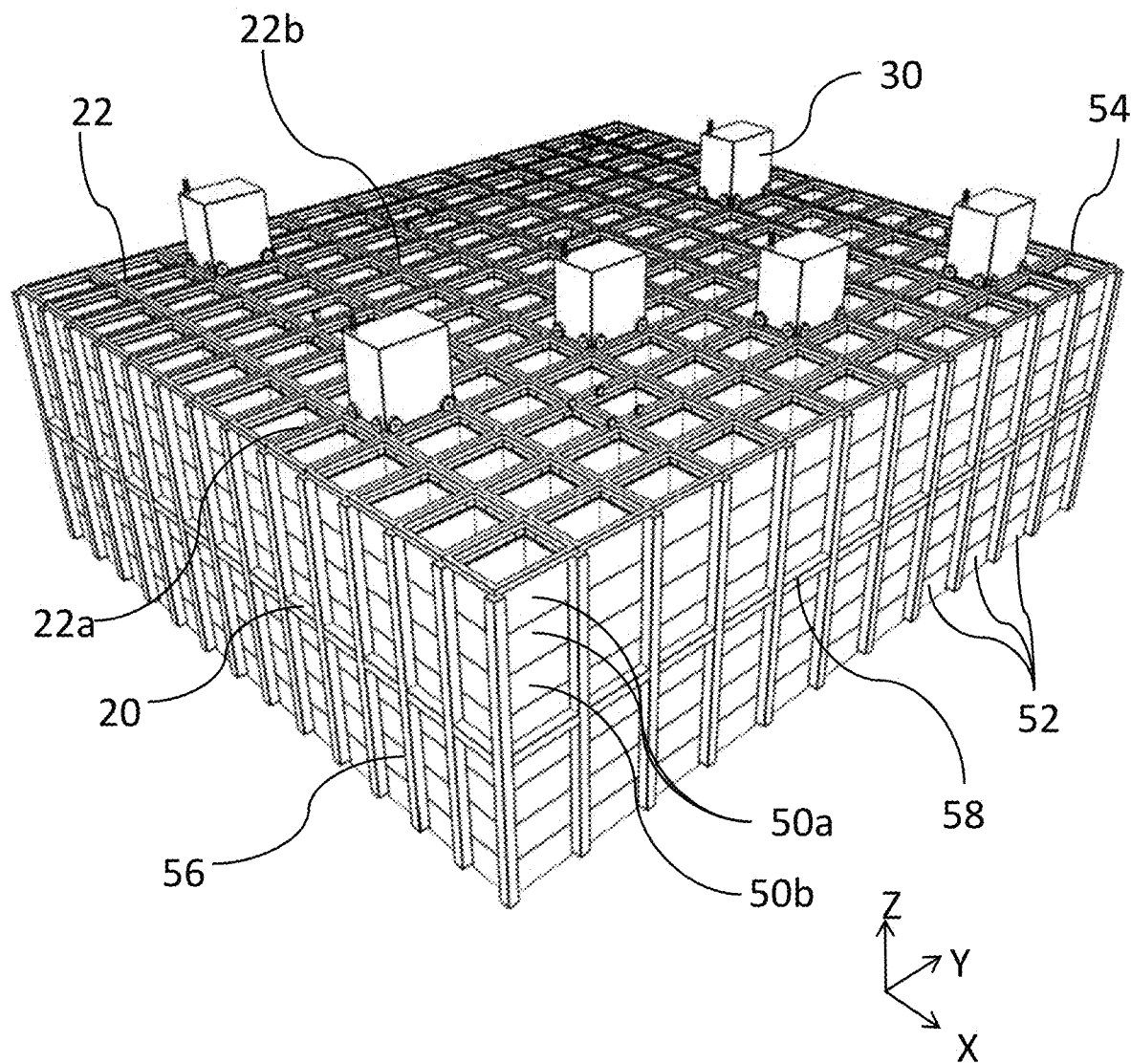
FIG. 20 is a schematic diagram of a system showing load handling devices operating on the framework structure.

The top level of the frame structure 54 includes rails 22 arranged in a grid pattern across the top of the stacks 52. Referring additionally to FIGS. 19 and 20, the rails 22 support a plurality of robotic load handling devices 30. A first set 22a of parallel rails 22 guide movement of the load handling devices 30 in a first direction (X) across the top of the frame structure 54, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 laterally in two dimensions in the horizontal X-Y plane, so that a load handling device 30 can be moved into position above any of the stacks 52.

One form of load handling device 30 is further described in Norwegian patent number 317366, the contents of which are incorporated herein by reference. FIGS. 19(a) and 19(b) are schematic cross sectionals views of a load handling device 30 depositing a bin 50, and FIG. 19(c) is a schematic front perspective view of a load handling device 30 lifting a bin 50. However, there are other forms of load handling device that may be used in combination with the system herein described. For example a further form of robotic load handling device is described in PCT Patent Publication No. WO2015/019055, hereby incorporated by reference, (Ocado) where each robotic load handler only covers one grid space of the frame work structure, thus allowing higher density of load handlers and thus higher throughput for a given sized system.

Each load handling device 30 comprises a vehicle 32 which is arranged to travel in the X and Y directions on the rails 22 of the frame structure 54, above the stacks 52. A first set of wheels 34, consisting of a pair of wheels 34 on the front of the vehicle 32 and a pair of wheels 34 on the back of the vehicle 32, is arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 is lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

The load handling device 30 is equipped with a lifting device. The lifting device 40 comprises a gripper plate 39 is suspended from the body of the load handling device 32 by four cables 38. The cables 38 are connected to a winding mechanism (not shown) housed within the vehicle 32. The cables 38 can be spooled in or out from the load handling device 32, so that the position of the gripper plate 39 with respect to the vehicle 32 can be adjusted in the Z direction.

The gripper plate 39 is adapted to engage with the top of a bin 50. For example, the gripper plate 39 may include pins (not shown) that mate with corresponding holes (not shown) in the rim that forms the top surface of the bin 50, and sliding clips (not shown) that are engageable with the rim to grip the bin 50. The clips are driven to engage with the bin 50 by a suitable drive mechanism housed within the gripper plate 39, which is powered and controlled by signals carried through the cables 38 themselves or through a separate control cable (not shown).

To remove a bin 50 from the top of a stack 52, the load handling device 30 is moved as necessary in the X and Y directions so that the gripper plate 39 is positioned above the stack 52. The gripper plate 39 is then lowered vertically in the Z direction to engage with the bin 50 on the top of the stack 52, as shown in FIG. 19(c). The gripper plate 39 grips the bin 50, and is then pulled upwards on the cables 38, with the bin 50 attached. At the top of its vertical travel, the bin 50 is accommodated within the vehicle body 32 and is held above the level of the rails 22. In this way, the load handling device 30 can be moved to a different position in the X-Y plane, carrying the bin 50 along with it, to transport the bin 50 to another location. The cables 38 are long enough to allow the load handling device 30 to retrieve and place bins from any level of a stack 52, including the floor level. The weight of the vehicle 32 may be comprised in part of batteries that are used to power the drive mechanism for the wheels 34, 36.

As shown in FIG. 20, a plurality of identical load handling devices 30 are provided, so that each load handling device 30 can operate simultaneously to increase the throughput of the system. The system illustrated in FIG. 20 may include specific locations, known as ports, at which bins 50 can be transferred into or out of the system. An additional conveyor system (not shown) is associated with each port, so that bins 50 transported to a port by a load handling device 30 can be transferred to another location by the conveyor system, for example to a picking station (not shown). Similarly, bins 50 can be moved by the conveyor system to a port from an external location, for example to a bin-filling station (not shown), and transported to a stack 52 by the load handling devices 30 to replenish the stock in the system.

The picking station may comprise the robot system 3 which is arranged to be controlled by the controller 1. In this regard, the organized point cloud generator 2 may be located in a suitable location of the picking station. The robot system 3 may be arranged to pick an item from a first container moved to a picking station by a load handling device 30. The picked item may be relocated into a second container which was also moved to the picking station by a load handling device 30. Each of the first and second containers may then be re-stored in the stacks 52 by a load handling device 30. In this way, automated relocation of objects from one container to another container is effected in an automated warehouse. Although the above example relates to a picking station it will be appreciated that other stations used with regards to the storage system may be used such as station which require the removal of debris located in a container. Such debris may be automatically removed by the robot system 3 from the container.

Each load handling device 30 can lift and move one bin 50 at a time. If it is necessary to retrieve a bin 10b ("target bin") that is not located on the top of a stack 52, then the overlying bins 50a ("non-target bins") must first be moved to allow access to the target bin 10b. This is achieved in an operation referred to hereafter as "digging".

Referring to FIG. 20, during a digging operation, one of the load handling devices 30 sequentially lifts each non-target bin 50a from the stack 52 containing the target bin 50b and places it in a vacant position within another stack 52. The target bin 50b can then be accessed by the load handling device 30 and moved to a port for further transportation.

Each of the load handling devices 30 is under the control of a central computer. Each individual bin 50 in the system is tracked, so that the appropriate bins 50 can be retrieved, transported and replaced as necessary. For example, during a digging operation, the locations of each of the non-target bins 50a is logged, so that the non-target bins 50a can be tracked.

The system described with reference to FIGS. 17 to 20 has many advantages and is suitable for a wide range of storage and retrieval operations. In particular, it allows very dense storage of product, and it provides a very economical way of storing a huge range of different items in the bins 50, while allowing reasonably economical access to all of the bins 50 when required for picking.

However, there are some drawbacks with such a system, which all result from the above-described digging operation that must be performed when a target bin 50b is not at the top of a stack 52.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

1. A control device for a robot system, the control device is configured for connection to: an organized point cloud generator configured to generate an organized point cloud of at least one storage means configured to store at least one object, and a robot system having a suction cup end effector configured to grasp at least one object from the at least one storage means, the control device comprising:
    a surface calculating means configured to calculate normals of the organized point cloud and principal curvatures of the organised point cloud; and
    a grasp point calculating means configured to calculate a grasp point for a suction cup end effector of a robot system to grasp at least one object from at least one storage means, wherein the grasp point is calculated based on the organized point cloud, the calculated normals of the organized point cloud, the calculated principal curvatures of the organized point cloud and a normal of a lower surface of the storage means.

2. The control device according to claim 1, the control device comprising:
    a segmenting means configured to generate segments based on the organized point cloud,
    wherein the grasp point calculating means is further configured to calculate the grasp point for the suction cup end effector of the robot system to grasp at least one object based on the generated segments.

3. The control device according to claim 2, wherein the surface calculating means is further configured to calculate a smoothed organized point cloud;
    wherein the grasp point calculating means is further configured to calculate the grasp point for the suction cup end effector of the robot system to grasp at least one object based on the calculated smoothed organized point cloud.

4. The control device according to claim 3, wherein when the grasp point calculating means is unable to calculate a grasp point, the controller is configured to at least one of:
    generate an indication that the at least one storage means is empty, or cause the grasp point calculating means to re-calculate a grasp point with at least one segment disregarded.

5. The control device according to claim 4, wherein the grasp point calculating means further comprises:
    a radius selecting means configured to select segments whose radius is larger than a radius of the suction cup end effector;
    a candidate calculating means configured to calculate grasp point candidates based on the radius of the selected segments, the calculated normals of the organized point cloud, the calculated smoothed organized point cloud and the calculated principal curvatures of the organized point cloud;
    a size and height selecting means configured to select segments of the calculated grasp point candidates based on a size of the selected segments and a distance of the selected segments from a lower surface of the storage means; and
    a sorting means configured to:
        sort the size and height of the selected segments according to a neighborhood flatness of grasp point candidates based on the calculated principal curvatures of the organized point cloud; and
        select the grasp point from the grasp point candidates.

6. The control device according to claim 5, wherein the radius selecting means further comprises:
    a centroid finding means configured to locate a segment centroid in each segment;
    a distance calculating means configured to calculate a distance in each segment between the segment centroid and a point on a boundary of the segment furthest to the segment centroid; and
    a distance thresholding means configured to determine whether the calculated distance is greater than the radius of the suction cup end effector.

7. The control device according to claim 5, wherein the candidate calculating means further comprises:
    a threshold calculating means configured to calculate a principal curvature threshold as a predetermined percentile of principal curvature norms of all selected segments;
    a selecting means configured to select grasp point candidates based on whether at least one of:
        a distance of a grasp point candidate to a boundary of its segment is greater than a predetermined threshold,
        a principal curvature norm of the grasp point candidate is less than a principal curvature threshold calculated by the threshold calculating means,
        an angle between a normal of the grasp point candidate and a normal of a lower surface of the at least one storage means is less than a predetermined threshold, and a distance of the grasp point candidate to the centroid of its segment is less than a predetermined threshold;

a large segment discarding means configured to:
calculate a minimum of distances between the centroid of each segment of the selected grasp point candidates and its boundary points as measured over a surface, and
generate an average distance based on calculated distances and configured to select segments whose calculated distance is less than a calculated average distance multiplied by a predetermined value; and a slanted surface region detecting means configured to:
calculate an angle between the normal of selected grasp point candidates and a normal of a lower surface of the at least one storage means, and
generate an angle threshold based on the calculated angles and configured to select segments whose calculated angle is less than a calculated angle threshold.

8. The control device according to claim 7, wherein the size and height selecting means comprises:
an average height and size calculating means configured to:
calculate an average distance from a lower surface of the at least one storage means for each segment having grasp point candidates selected by the grasp point calculating means,
calculate an average distance from a lower surface of the at least one storage means for all segments having grasp point candidates selected by the grasp point calculating means,
calculate an average size for each segment having grasp point candidates selected by the grasp point calculating means, and
calculate an average size for all segments having grasp point candidates selected by the grasp point calculating means; and
a height and size thresholding means configured to select at least one of: segments whose calculated average distance from the lower surface of the at least one storage means is greater than a percentile of the calculated average distance from the lower surface of the at least one storage means for all segments; and segments whose calculated average size is greater than the calculated average size for all segments multiplied by a predetermined factor.

9. The control device according to claim 8, wherein the sorting means further comprises:
a flatness calculating means configured to determine a flatness rating for each point within a subset of the grasp point candidates based on a principal curvature norm at each segment point in a segment, and distances between a grasp point candidate and the segment points;
an equalizing means configured to adjust a distribution of flatness ratings of all of the candidate grasp point subsets;
a weighting means configured to assign a weight to each equalized flatness rating relative to a segment centroid of the segment in which it is located; and
a flatness selecting means configured to select a grasp point candidate with a maximal weighted flatness rating from selected segments.

10. The control device according to claim 2, wherein the segmenting means comprises:
an organized point cloud calculating means configured to calculate: normals of the organized point cloud, a smoothed organized point cloud, first and second derivatives of the organized point cloud, principal curvatures of the organized point cloud and a confidence map;
an image calculating means configured to calculate a segmentable image from a calculated first derivative, maximum principal curvatures and the confidence map; and
a seeding means configured to generate seed segments.

11. The control device according to claim 10, wherein the organized point cloud calculating means and the surface calculating means are integrally formed together.

12. The control device according to claim 10, wherein the organized point cloud calculating means is configured to calculate normals of the organized point cloud, a smoothed point cloud, first and second derivatives of the organized point cloud, principal curvatures of the organized point cloud, and a confidence map by fitting polynomials to one-dimensional slices of the organized point cloud windows of a predetermined radius.

13. The control device according to claim 10, wherein the image calculating means is configured to calculate the segmentable image by multiplying: an equalized negation of a maximum principal curvatures image, an equalized negation of an organized point cloud gradient norms image, and a pixelwise power of a confidence map, wherein
the equalised negation of a maximum principal curvatures image includes minimal values in organized point cloud valleys and maximal values at peaks; and
the equalised negation of an organized point cloud gradient norms image includes minimal values on steep surfaces and maximal values on horizontal surfaces.

14. The control device according to claim 10, wherein the seeding means is configured to generate seed segments by identifying regions of the segmentable image in which a segmentable image value exceeds a predetermined threshold.

15. The control device according to claim 10, comprising:
a limiting means configured to impose limits on a boundary of each seeded segment beyond which the segment can't be grown.

16. The control device according to claim 10, further comprising:
a growing means configured to grow the seed segments; and
a merging means configured to merge the grown segments.

17. The control device according to claim 16, wherein the merging means is configured to merge two of the grown segments when:
a ratio between a length of an interface between two grown segments to a length of perimeters of the two grown segments is greater than a predetermined threshold; and
a distribution of image values along the interface is similar to a distribution of image values within both of the segments.

18. A system comprising:
an organized point cloud generator configured to generate an organized point cloud of at least one storage means having at least one object;
a robot system having a suction cup end effector configured to grasp at least one object from the at least one storage means; and a control device, including:
  a surface calculating means configured to calculate normals of the organized point cloud and principal curvatures of the organized point cloud; and
  a grasp point calculating means configured to calculate a grasp point for a suction cup end effector of a robot system to grasp at least one object from at least one storage means, wherein the grasp point is calculated based on the organized point cloud, the calculated normals of the organized point cloud, the calculated principal curvatures of the organized point cloud and a normal of a lower surface of the storage means,
  wherein the control device is configured to control the robot system based on the calculated grasp points.

19. A grocery shopping packing system comprising:
a first storage means configured to store many objects of a same product;
a second storage means configured to store many objects of different products; and
a control system including:
  an organized point cloud generator configured to generate an organized point cloud of at least one storage means having at least one object;
  a robot system having a suction cup end effector configured to grasp at least one object from the at least one storage means; and
  a control device, including:
    a surface calculating means configured to calculate normals of the organized point cloud and principal curvatures of the organized point cloud; and
    a grasp point calculating means configured to calculate a grasp point for a suction cup end effector of a robot system to grasp at least one object from at least one storage means, wherein the grasp point is calculated based on the organized point cloud, the calculated normals of the organized point cloud, the calculated principal curvatures of the organized point cloud and a normal of a lower surface of the storage means,
    wherein the control device is configured to control the robot system based on the calculated grasp points, and
  wherein the robot system is configured to move at least one object from the first storage means into the second storage means.

20. A storage system comprising:
a first set of parallel rails or tracks extending in an X-direction, and a second set of parallel rails or tracks extending in a Y-direction transverse to the first set in a substantially horizontal plane to form a grid pattern having a plurality of grid spaces;
a plurality of stacks of containers located beneath the rails, and configured such that each stack is located within a footprint of a single grid space;
at least one transporting device, the at least one transporting device being configured to selectively move in the X and/or Y directions, above the stacks on the rails and configured to transport a container;
a picking station configured to receive a container transported by the at least one transporting device; and
a control system including:
  an organized point cloud generator configured to generate an organized point cloud of at least one storage means having at least one object;
  a robot system having a suction cup end effector configured to grasp at least one object from the at least one storage means; and
  a control device, including:
    a surface calculating means configured to calculate normals of the organized point cloud and principal curvatures of the organized point cloud; and
    a grasp point calculating means configured to calculate a grasp point for a suction cup end effector of a robot system to grasp at least one object from at least one storage means, wherein the grasp point is calculated based on the organized point cloud, the calculated normals of the organized point cloud, the calculated principal curvatures of the organized point cloud and a normal of a lower surface of the storage means,
    wherein the control device is configured to control the robot system based on the calculated grasp points, and
    wherein the control system is configured to grasp an object from a container.

21. The storage system according to claim 20, wherein the at least one transporting device is configured with a footprint that occupies only a single grid space in the storage system, such that the transporting device occupying one grid space will not obstruct a different transporting device occupying or traversing adjacent grid spaces in the X and Y directions.

22. A method of controlling a robot system, the robot system having a suction cup end effector and configured to grasp at least one object from at least one storage means configured to store the at least one object, the method comprising:
receiving an organized point cloud of the at least one storage means;
calculating normals of the organized point cloud and of principal curvatures of the organized point cloud; and
calculating a grasp point for the suction cup end effector of the robot system to grasp the at least one object from the at least one storage means based on the organized point cloud, the calculated normals of the organized point cloud, the calculated principal curvatures of the organized point cloud, and a normal of a lower surface of the storage means.

23. The method according to claim 22, comprising:
generating segments based on the organized point cloud;
wherein the grasp point for the suction cup end effector of the robot system to grasp at least one object is calculated based on the generated segments.

24. The method according to claim 22, comprising:
calculating a smoothed organized point cloud:
wherein the grasp point for the suction cup end effector of the robot system to grasp at least one object from the at least one storage means is calculated based on the calculated smoothed organized point cloud.

25. The method according to claim 22, wherein when the grasp point cannot be calculated, the method comprises at least one of:
generating an indication that the at least one storage means is empty; and
re-calculating a grasp point with at least one segment disregarded.

26. The method according to claim 22, comprising:
selecting segments whose radius is larger than a radius of the suction cup end effector;
calculating grasp point candidates based on radius selected segments, the calculated normals of the organized point cloud, the calculated smoothed organized point cloud, and the calculated principal curvatures of the organized point cloud;

selecting segments of the calculated grasp point candidates based on a size of the selected segments and a distance of the selected segments from a lower surface of the at least one storage means;
sorting the size and distance of the selected segments according to a neighborhood flatness of grasp point candidates based on the calculated principal curvatures of the organized point cloud; and
selecting a grasp point for the robot system.

27. The method according to claim 26, comprising:
locating a segment centroid in each segment;
calculating a distance in each segment between the segment centroid and a point on a boundary of the segment furthest to the segment centroid; and
determining whether the calculated distance is greater than a radius of the suction cup end effector.

28. The method according to claim 26, comprising:
calculating a principal curvature threshold as a predetermined percentile of all principal curvatures norms of all selected segments;
selecting grasp point candidates based on at least one of whether:
   a distance of a grasp point candidate to a boundary of its segment is greater than a predetermined threshold,
   a principal curvature norm of the grasp point candidate is less than a threshold calculated by the threshold calculating,
   an angle between a normal of the grasp point candidate and a normal of a lower surface of the at least one storage means is less than a predetermined threshold, or
   a distance of the grasp point candidate to the centroid of its segment is less than a predetermined threshold;
calculating a minimum of distances between the segment centroid of each segment of the selected grasp point candidates and its boundary points as measured over the surface;
generating an average distance based on the calculated distances;
selecting segments whose calculated distance is less than a calculated average multiplied by a predetermined value;
calculating an angle between a normal of selected grasp point candidates and a normal of the lower surface of the at least one storage means;
generating an angle threshold based on calculated angles; and
selecting segments whose calculated angle is less than the angle threshold.

29. The method according to claim 26, comprising:
calculating an average distance from a lower surface of the at least one storage means for each segment having grasp point candidates selected by the grasp point candidate calculating step;
calculating an average distance from a lower surface of the at least one storage means for all segments having grasp point candidates selected by the grasp point candidate calculating;
calculating an average size for each segment having grasp point candidates selected by the grasp point candidate calculating;
calculating an average size for all segments having grasp point candidates selected by the grasp point candidate calculating; and
selecting segments whose calculated average distance from a lower surface of the at least one storage means is greater than a percentile of a calculated average distance from the lower surface of the at least one storage means for all segments, or selecting segments whose calculated average size is greater than a calculated average size for all segments multiplied by a predetermined factor.

30. The method according to claim 26, comprising:
determining a flatness rating for each point within a subset of the grasp point candidates based on a principal curvature norm at each point in the segment and distances between the grasp point candidate and the segment points;
adjusting a distribution of flatness ratings of all of the candidate grasp point subsets;
weighting each equalized flatness rating relative to the segment centroid of the segment in which it is located; and
selecting a grasp point candidate with a maximal weighted flatness rating from the selected segments.

31. The method according to claim 26, wherein comprising:
calculating normals of the organized point cloud, a smoothed organized point cloud, first and second derivatives of the organized point cloud, principal curvatures of the organized point cloud, and a confidence map;
determining a segmentable image from the calculated first derivative, maximum principal curvatures, and the confidence map; and
generating seed segments.

32. The method according to claim 31, comprising:
calculating normals of the organized point cloud, the smoothed point cloud, the first and second derivatives of the organized point cloud, the principal curvatures of the organized point cloud, and the confidence map by fitting polynomials to one-dimensional slices of organized point cloud windows of a predetermined radius.

33. The method according to claim 31, comprising:
calculating the segmentable image as a pixelwise product of: an equalised negation of a maximum principal curvatures image, an equalised negation of an organized point cloud gradient norms image, and a pixelwise power of a confidence map, wherein
the equalised negation of a maximum principal curvatures image includes minimal values in organized point cloud valleys and maximal values at peaks, and
the equalised negation of an organized point cloud gradient norms image includes minimal values on steep surfaces and maximal values on horizontal surfaces.

34. The method according to claim 31, comprising:
generating seed segments by identifying regions of a segmentable image in which a segmentable image value exceeds a predetermined threshold.

35. The method according to claim 31, comprising:
imposing limits on a boundary of each seeded segment beyond which the segments segment can't be grown.

36. The method according to claim 31, comprising:
growing the seed segments; and
merging the grown segments.

37. The method according to claim 36, comprising:
merging two grown segments when:
   a ratio between a length of an interface between two grown segments to a length of perimeters of the two grown segments is greater than a predetermined threshold; and a distribution of image values along the interface is similar to a distribution of image values within both of the segments.

* * * * *